United States Patent
Olgaard

(10) Patent No.: US 8,676,188 B2
(45) Date of Patent: Mar. 18, 2014

(54) APPARATUS, SYSTEM AND METHOD FOR CALIBRATING AND VERIFYING A WIRELESS COMMUNICATION DEVICE

(75) Inventor: Christian Volf Olgaard, Sunnyvale, CA (US)

(73) Assignee: LitePoint Corporation, Sunnyvale, CA (US)

( * ) Notice: Subject to any disclaimer, the term of this patent is extended or adjusted under 35 U.S.C. 154(b) by 1286 days.

(21) Appl. No.: 11/839,788

(22) Filed: Aug. 16, 2007

(65) Prior Publication Data

US 2008/0285467 A1 Nov. 20, 2008

Related U.S. Application Data

(63) Continuation-in-part of application No. 11/279,778, filed on Apr. 14, 2006, now Pat. No. 7,689,213.

(51) Int. Cl.
*H04W 24/00* (2009.01)
*H04B 17/00* (2006.01)
*H04B 7/00* (2006.01)

(52) U.S. Cl.
USPC ............. 455/423; 455/67.14; 455/115.1; 455/226.1; 455/522; 703/13

(58) Field of Classification Search
USPC .......... 455/423, 69, 522, 67.14, 115.1, 226.1; 703/13
See application file for complete search history.

(56) References Cited

U.S. PATENT DOCUMENTS

| | | |
|---|---|---|
| 4,364,080 A | 12/1982 | Vidovic |
| 4,833,676 A | 5/1989 | Koo |
| 4,897,842 A | 1/1990 | Herz |
| 5,138,608 A | 8/1992 | Kucera et al. |
| 5,335,010 A | 8/1994 | Lindemeier et al. |
| 5,910,977 A | 6/1999 | Torregrossa |
| 6,104,304 A | 8/2000 | Clark et al. |

(Continued)

FOREIGN PATENT DOCUMENTS

| | | |
|---|---|---|
| CN | 1512802 A | 7/2004 |
| CN | 1540876 A | 10/2004 |

(Continued)

OTHER PUBLICATIONS

Office Action dated May 18, 2010 corresponding to U.S. Appl. No. 11/839,828, 8 pages.

(Continued)

*Primary Examiner* — Kashif Siddiqui
*Assistant Examiner* — Omoniyi Obayanju

(57) ABSTRACT

An apparatus for testing a wireless communication device includes a receiver, a capture module, and a control module. The receiver receives at least one test packet transmitted from the wireless communication device. The capture module captures at least a portion of the at least one test packet. The control module selectively controls the capture module to capture at least the portion based on a predetermined test flow. In one example, the at least one test packet is transmitted by the wireless communication device according to the predetermined test flow. In one example, control module selectively controls the capture module to capture at least the portion based on an expected calibration value associated with the at least one test packet. In one example, the control module selectively controls the capture module to capture at least the portion based on a predetermined value of interest.

35 Claims, 15 Drawing Sheets

(56) References Cited

U.S. PATENT DOCUMENTS

| | | |
|---|---|---|
| 6,229,808 B1 | 5/2001 | Teich et al. |
| 6,442,163 B1 | 8/2002 | Chopping |
| 6,480,489 B1 | 11/2002 | Muller et al. |
| 6,532,357 B1 | 3/2003 | Ichikawa |
| 6,567,375 B2 | 5/2003 | Balachandran et al. |
| 6,714,985 B1 | 3/2004 | Malagrino et al. |
| 6,724,730 B1 | 4/2004 | Mlinarsky |
| 6,753,693 B2 | 6/2004 | Seo et al. |
| 6,779,050 B2 | 8/2004 | Horton et al. |
| 6,781,992 B1 | 8/2004 | Rana et al. |
| 6,785,239 B1 | 8/2004 | Tasker |
| 6,870,392 B2 | 3/2005 | Kilian et al. |
| 6,914,944 B1 | 7/2005 | Nokkonen et al. |
| 6,950,442 B2 | 9/2005 | Chai et al. |
| 6,963,572 B1 | 11/2005 | Carr et al. |
| 6,986,086 B2 | 1/2006 | Scholten |
| 6,988,212 B1 | 1/2006 | Hamdi |
| 7,057,518 B2 | 6/2006 | Schmidt |
| 7,065,155 B2 | 6/2006 | Kaczynski |
| 7,126,515 B1 | 10/2006 | Kris |
| 7,161,666 B2 * | 1/2007 | French et al. ............... 356/73.1 |
| 7,206,549 B2 | 4/2007 | Lin et al. |
| 7,263,355 B2 | 8/2007 | Morikawa et al. |
| 7,324,785 B2 | 1/2008 | Hansen et al. |
| 7,463,140 B2 | 12/2008 | Schmidt |
| 7,484,146 B2 | 1/2009 | Olgaard et al. |
| 7,515,884 B2 | 4/2009 | Blech et al. |
| 7,519,878 B2 * | 4/2009 | Rosen ......................... 714/723 |
| 7,564,893 B2 | 7/2009 | O'Neill |
| 7,565,119 B2 | 7/2009 | Cohen |
| 7,567,521 B2 | 7/2009 | Olgaard et al. |
| 7,583,976 B2 | 9/2009 | Batra et al. |
| 7,634,815 B2 | 12/2009 | Kumaki et al. |
| 7,672,669 B2 | 3/2010 | Alexander |
| 7,702,330 B2 | 4/2010 | Alexander |
| 7,890,822 B2 | 2/2011 | Behziz et al. |
| 2001/0010751 A1 | 8/2001 | Amino et al. |
| 2002/0031125 A1 | 3/2002 | Sato et al. |
| 2002/0105947 A1 | 8/2002 | Kitagawa et al. |
| 2003/0119463 A1 | 6/2003 | Lim |
| 2004/0076138 A1 | 4/2004 | Serceki et al. |
| 2004/0133733 A1 | 7/2004 | Bean et al. |
| 2004/0203443 A1 | 10/2004 | Woolf et al. |
| 2004/0203467 A1 | 10/2004 | Liu et al. |
| 2005/0032511 A1 | 2/2005 | Malone et al. |
| 2005/0176376 A1 | 8/2005 | Liu |
| 2005/0208910 A1 | 9/2005 | Burns et al. |
| 2005/0243743 A1 | 11/2005 | Kimura |
| 2005/0260962 A1 | 11/2005 | Nazrul et al. |
| 2005/0281232 A1 | 12/2005 | Kim et al. |
| 2006/0106946 A1 | 5/2006 | Agarwal et al. |
| 2006/0183432 A1 | 8/2006 | Breslin et al. |
| 2006/0239337 A1 | 10/2006 | Green et al. |
| 2006/0259629 A1 * | 11/2006 | Usmani et al. ............... 709/227 |
| 2006/0282247 A1 | 12/2006 | Brennan et al. |
| 2007/0071034 A1 | 3/2007 | Fleming |
| 2007/0072599 A1 | 3/2007 | Romine et al. |
| 2007/0091814 A1 | 4/2007 | Leung et al. |
| 2007/0093243 A1 | 4/2007 | Kapadekar et al. |
| 2007/0105587 A1 | 5/2007 | Lu |
| 2007/0167155 A1 | 7/2007 | Ishidu |
| 2007/0280196 A1 | 12/2007 | Olgaard et al. |
| 2007/0294378 A1 | 12/2007 | Olgaard et al. |

FOREIGN PATENT DOCUMENTS

| | | |
|---|---|---|
| CN | 1592245 A | 3/2005 |
| EP | 1489866 A1 | 12/2004 |
| GB | 2398466 A | 8/2004 |
| WO | WO2004059874 A1 | 7/2004 |
| WO | WO2005022775 A1 | 3/2005 |

OTHER PUBLICATIONS

International Preliminary Report on Patentability (IPRP) corresponding to International Application No. PCT/US2008/072460, International Bureau of WIPO, dated Feb. 16, 2010, 5 pages.

U.S. Appl. No. 60/596,444 filed Sep. 23, 2005, entitled "Method for Simultaneous Testing of Multiple Orthogonal Frequency Division Multiplexed Transmitters With Single Vector Signal Analyzer."

Written Opinion corresponding to International Application No. PCT/US2007/067853, dated Jun. 6, 2008, 4 pages.

International Search Report corresponding to International Application No. PCT/US2007/067853, dated Jun. 6, 2008, 3 pages.

Written Opinion corresponding to International Application No. PCT/US2007/067856, dated Sep. 18, 2008, 5 pages.

International Search Report corresponding to International Application No. PCT/US2007/067856, dated Sep. 18, 2008, 4 pages.

Written Opinion corresponding to International Application No. PCT/US2007/066211, dated Nov. 24, 2008, 5 pages.

International Search Report corresponding to International Application No. PCT/US2007/066211, dated Nov. 24, 2008, 2 pages.

Office Action dated Aug. 9, 2010 corresponding to U.S. Appl. No. 11/839,814, 7 pages.

Office Action referring to U.S. Appl. No. 11/839,814 dated Jan. 27, 2011, 6 pages.

Search Report for EP Application No. 07760300.9 dated Oct. 5, 2012; 6 Pages.

China Office Action Mailed Aug. 3, 2012 for Appl. No. 200880110667.X, in Chinese with partial English translation; 64 pages.

Chinese Office Action Dated Mar. 25, 2013 (With English Translation) for Application No. 200880110667, Titled "Apparatus, System and Method for Calibrating and Verifying a Wireless Communication Device".

Chinese Office Action Dated Jul. 24, 2013 (With English Translation) for Application No. 200880110667.X, Titled "Apparatus, System and Method for Calibrating and Verifying a Wireless Communication Device".

U.S. Appl. No. 11/839,828, filed Aug. 16, 2007, entitled "System for Testing an Embedded Wireless Transceiver".

U.S. Appl. No. 11/279,778, filed Apr. 14, 2006, entitled "Method for Testing Embedded Wireless Transceiver with Minimal Interaction Between . . .".

U.S. Appl. No. 11/161,692, filed Aug. 12, 2005, entitled "Method for Measuring Multiple Parameters of a Signal Transmitted by a Signal Generator".

U.S. Appl. No. 11/422,475, filed Jun. 6, 2006, entitled "Method for Capturing Multiple Data Packets in a Data Signal for Analysis".

U.S. Appl. No. 11/422,489, filed Jun. 6, 2006, entitled "Apparatus for Capturing Multiple Data Packets in a Data Signal for Analysis".

U.S. Appl. No. 11/839,814, filed Aug. 16, 2007, entitled "System for Testing an Embedded Wireless Transceiver".

International Search Report for International Application No. PCT/US08/72462 dated Oct. 30, 2008, 3 pp.

Written Opinion for International Application No. PCT/US08/72462 dated Oct. 30, 2008, 4 pp.

\* cited by examiner

APPARATUS, SYSTEM AND METHOD FOR CALIBRATING AND VERIFYING A WIRELESS COMMUNICATION DEVICE

RELATED CO-PENDING APPLICATIONS

This application is a continuation-in-part of U.S. patent application Ser. No. 11/279,778 filed on Apr. 14, 2006. This application is also related to co-pending U.S. patent application Ser. Nos. 11/422,475 and 11/422,489 filed on Jun. 6, 2006, which are hereby incorporated by reference in their entirety.

BACKGROUND

1. Field of the Invention

The present disclosure relates to wireless communication systems, and more particularly to production testing of wireless communication systems.

2. Related Art

As the number and uses of wireless data communication systems increase, it has become increasingly important to the manufacturers of such systems to perform production testing of the wireless transceivers embedded in such systems in a more time-efficient manner. As is well known, a problem with production testing of such embedded transceivers is that no direct, e.g., wired, digital control connection is generally available between the device under test (DUT) and the test controller (e.g., personal computer). Instead, communication must take place through the host processor also embedded within the system. Accordingly, production testing becomes more complicated since testing firmware must be installed or stored for running on the embedded host processor.

While using firmware in an embedded processor may be acceptable for a single platform, this approach quickly becomes unacceptable when multiple platforms are involved and must be supported. Further, as is often the case, the wireless transceiver function, e.g., a wireless transceiver operating according to the IEEE 802.11 standard, is merely a small portion of the overall set of functions of the host system. Accordingly, the manufacturer, while interested in producing a fully functional wireless transceiver capability, is nonetheless not interested in spending significant resources on integrating the wireless function in view of its limited role in the overall operation of the system.

Many well-known and popular data communications systems include wireless transceivers that communicate via digital data signals in which the data is distributed among a number of data packets which are transmitted sequentially and then reassembled within the receiver, often following transmission along various distinct signal paths (e.g., as is done with the Internet). Conventional test equipment for measuring these data signals capture these data packets, store them and then transfer them for analysis. Often, the transfer and analysis of the captured data takes longer than the process by which they are captured from within the data signal, in part because of the need to transfer the captured data to remote analysis circuitry (e.g., a computer separate from the test equipment). Consecutive data packets are often closely spaced, particularly within data signals being transmitted at high data rates. Accordingly, conventional test equipment will often not measure consecutive packets, but instead will capture non-adjacent packets spaced in time by an interval approximating the time needed for analysis or measurement.

However, it is often desirable to capture consecutive packets, e.g., to analyze power variations from one packet to another. To do this with conventional test equipment, it would generally be necessary to increase the time interval available for capturing the data packets, thereby causing the capture window to become equal to the duration of the number of consecutive data packets sought to be captured and analyzed. This, however, is disadvantageous due to the fact that increasing the capture window will also slow down the overall data capture and analysis operation, since more data will need to be transferred between the capture memory and analysis engine. Further, in many communication systems, the data packets are not closely spaced, which means that much of the captured data is unused since it corresponds to the gaps between consecutive data packets.

SUMMARY

In one example, an apparatus for testing a wireless communication device includes a receiver, a capture module, and a control module. The receiver receives at least one test packet transmitted from the wireless communication device. The capture module captures at least a portion of the at least one test packet. The control module selectively controls the capture module to capture at least the portion based on a predetermined test flow. In one example, the at least one test packet is transmitted by the wireless communication device according to the predetermined test flow. A related method is also disclosed.

In one example, the control module selectively controls the capture module to capture at least the portion based on an expected calibration value associated with the at least one test packet. In one example, the control module controls the capture module to capture at least the portion when the wireless communication device transmits the at least one test packet based on a calibration value that is substantially equal to the expected calibration value. In one example, the expected calibration value is based on a plurality of values including a transmit power calibration value, an oscillator calibration value, a phase calibration value, an amplitude calibration value, an in-phase DC offset calibration value, and/or a quadrature DC offset calibration value.

In one example, the control module selectively controls the capture module to capture at least the portion based on a predetermined value of interest. In one example, the control module controls the capture module to capture at least the portion when the wireless communication device transmits the at least one test packet based on a transmission value that corresponds with the predetermined value of interest. In one example, the predetermined value of interest is based on at least one of a transmit power value, a data rate value, and a modulation type value.

In one example, a wireless communication system in a test environment includes the apparatus and a device under test (DUT). The DUT includes a transmitter and a second control module. The transmitter transmits the at least one test packet. The second control module periodically adjusts a transmission characteristic of the transmitter from a first transmission characteristic to a second transmission characteristic based on the predetermined test flow. The second control module controls the transmitter to transmit the at least one test packet based on the predetermined test flow.

In one example, the DUT includes a calibration register. The calibration register stores a calibration value. The transmission characteristic is based on the calibration value. In one example, the calibration value is based on a transmit power calibration value, an oscillator calibration value, a phase calibration value, an amplitude calibration value, an in-phase DC offset calibration value, and/or a quadrature DC offset calibration value.

In one example, the transmission characteristic is based on a transmission data rate. In one example, the first and second transmission characteristics are based on a transmit power, a data rate, and/or a modulation type.

DETAILED DESCRIPTION

Figure 1:
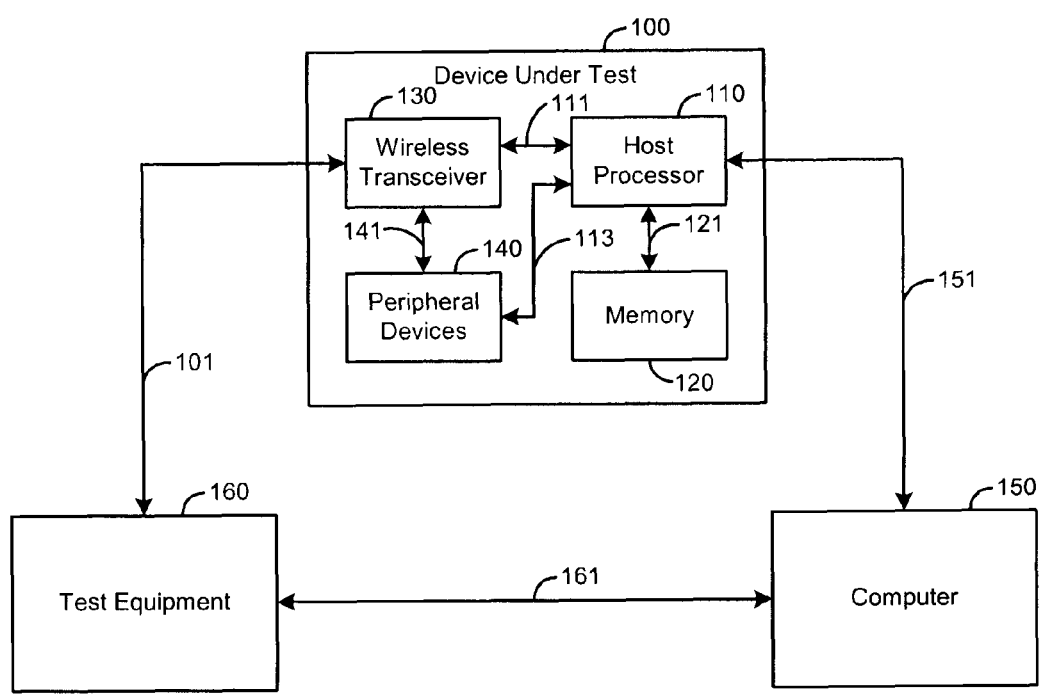
FIG. 1 is a functional block diagram of a wireless data communication system in a production test environment.

The following description of the embodiments is merely exemplary in nature and is in no way intended to limit the invention, its application, or uses. For purposes of clarity, the same reference numbers will be used in the drawings to identify similar elements. The embodiments are described in sufficient detail to enable one of ordinary skill in the art to practice the disclosure, and it will be understood that other embodiments may be practiced with some variations without departing from the spirit or scope of the subject invention.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. Absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described functionality. Additionally, the term "signal" may refer to one or more currents, one or more voltages, or a data signal. The phrase at least one of A, B, and C should be construed to mean a logical (A or B or C), using a non-exclusive logical or. Further, while the present disclosure has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Increased time efficiency of a system and method for testing a wireless device under test can be realized by selectively capturing and analyzing test packets from a wireless device based on a predetermined test flow. Furthermore, by pre-programming a wireless transceiver with the predetermined test flow, minimal, if any, communication between the wireless transceiver and host processor is needed during testing. Other advantages will be recognized by those of ordinary skill in the art.

Referring to FIG. 1, a wireless data communication system in a general production test environment includes a device under test (DUT) 100, a computer 150 for control of the testing, and test equipment 160 (e.g., including a vector signal generator (VSG) and a vector signal analyzer (VSA)), all interconnected substantially as shown. The DUT 100 has a number of embedded sub systems, including a host processor 110, memory 120 (e.g., non volatile memory), a wireless transceiver 130 (e.g., a transmitter and receiver) and one or more peripheral devices 140, interconnected substantially as shown. The host processor 110 controls the memory 120, wireless transceiver 130 and peripheral devices 140 via various control interfaces 121, 111, 113. Typically, the memory 120 stores, as firmware, programs to be used by the DUT 100. The control computer 150 generally runs the production test software that controls the DUT 100 through an external interface 151, e.g., universal serial bus (USB), serial peripheral interface (SPI), RS-232 serial interface, etc. The control computer 150 also controls the test equipment 160 via another interface 161, e.g., USB, general purpose interface bus (GPIB), Ethernet, etc. The test equipment 160 communicates with the wireless transceiver 130 via an interface 101, which can be a wireless interface, but for production testing purposes is usually a wired interface.

In a typical transmitter test scenario, the control computer 150 will send one or more commands to the host processor 110, which translates such commands into corresponding commands for the wireless transceiver 130. Following transmission of the test signal via the test interface 101, the control computer 150 retrieves the measurement results from the test equipment 160 (via its interface 161), following an appropriate delay for the wireless transceiver 130 to settle at its programmed output frequency and power.

As can be seen by this example, the commands necessary for the wireless transceiver 130 must pass through and be translated by the host processor 110. As the host processor 110 can be of many different types, and run many different operating systems, it will generally be very difficult to provide the necessary software inside the host processor 110 for translating the commands appropriately. Normally, such software must be written specifically for each application, thereby making it a difficult process for a system integrator to integrate the wireless transceiver 130 within the DUT 100.

As discussed in more detail below, a proposed test method in accordance with the present disclosure provides for simplified production testing using a predetermined test flow, or sequence, to verify the performance of the embedded wireless transceiver. By pre-programming the wireless transceiver with the test flow, minimal, if any, communication between the wireless transceiver and the host processor 110 will be needed during testing. The test flow can be uploaded to the transceiver 130 as part of the loading of the testing firmware, or can alternatively be made an integral part of the firmware, e.g., with a predetermined data area defining the tests. After completion of the loading of the firmware into the transceiver 130, the device will be placed into a test mode where it awaits commands from the test equipment 160. This can be done as part of the firmware that is loaded, or as a separate command issued by the host processor 110. As a result, the only interaction with the host processor 110 involves the loading of the firmware, loading of the test flow (unless it is an integrated portion of the firmware), and possibly a command to place the wireless transceiver 130 in a production test mode of operation.

Figure 2:
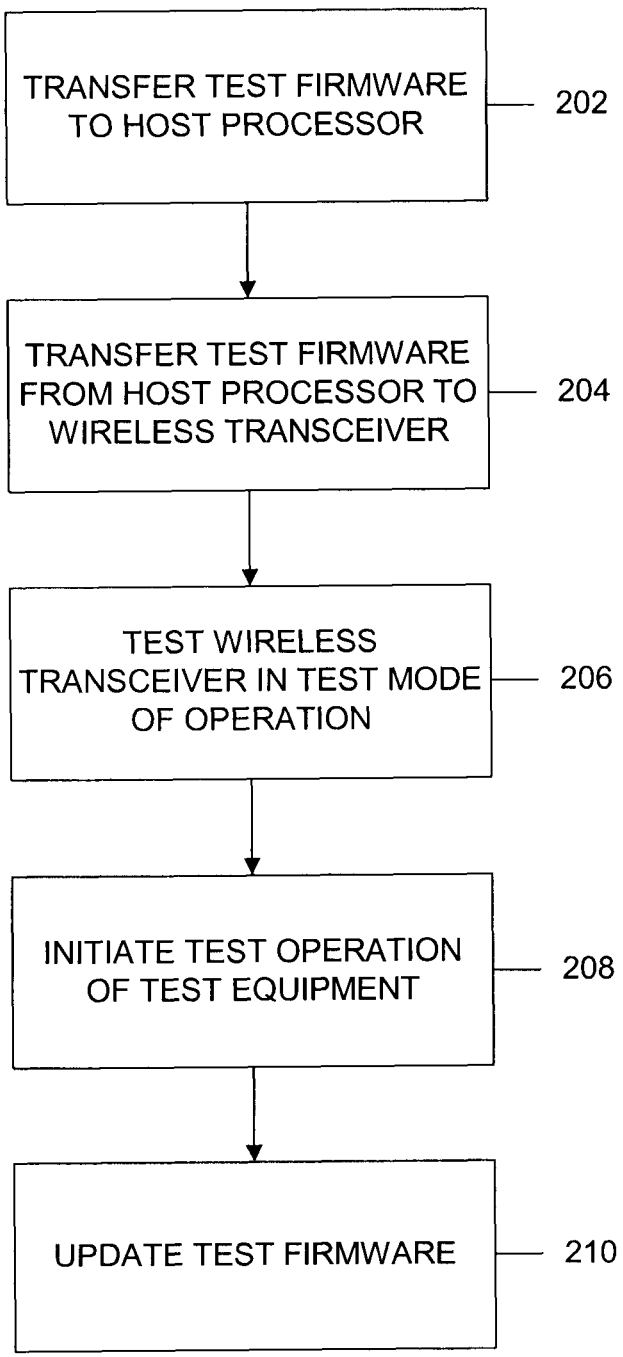
FIG. 2 depicts a method for testing the wireless data communication system of FIG. 1 in accordance with one embodiment of the presently claimed invention.

Referring to FIG. 2, one example of this method can be depicted as shown. In the first step 202, the test firmware is transferred to the host processor 110, generally by the control computer 150. In the next step 204, the test firmware is transferred from the host processor 110 to the wireless transceiver 130 via the interface 111. It should be understood that the test firmware may be complete in that it also includes the desired test flow, or sequence, as an integral part. Alternatively, the test flow data can be transferred to the host processor 110 from the computer 150, and then relayed to the wireless transceiver 130. As a further alternative, the desired test flow data can be in the form of a data table previously stored in the memory 120, that can now be retrieved via the interface 121 and relayed by the host processor 110 to the wireless transceiver 130.

In the next step 206, the wireless transceiver 130 is set in a test mode of operation, i.e., where the wireless transceiver 130 will now await one or more commands from the test equipment 160 (discussed in more detail below), e.g., by listening for a command from the test equipment 160 on a predetermined frequency. Such setting of the wireless transceiver 130 in its test mode operation can be initiated automatically as part of the test firmware that has been loaded, or can be initiated by an appropriate command issued by the host processor 110. In the next step 208, test operation of the test equipment 160 is initiated, e.g., by sending the appropriate command for which the wireless transceiver 130 is listening, as noted. Alternatively, the wireless transceiver 130 can transmit a "ready" signal at a predetermined frequency, following the reception of which the test equipment 160 will begin sending one or more test commands. Preferably, the command set is minimal, e.g., only a NEXT type of command, thereby requiring only that the receiver watch for a good data packet (e.g., representing a NEXT command), and further thereby not requiring any media access control (MAC) layer operations. Following transmission of the initial test command from the test equipment 160, the wireless transceiver 130 preferably transmits an acknowledgement signal to indicate reception of such command, following which the main sequence of test commands from the test equipment 160 will begin. Controlling of the test equipment 160 is done under supervision by the control computer 150 via the interface 161.

A subsequent step 210 can include updating of the test firmware loaded into the wireless transceiver 130, whereby various operation settings, parameters or conditions can be modified based on data (e.g., transceiver calibration data) received from the control computer 150 via the host processor 110 or from a data table stored in the memory 120 conveyed via the host processor 110 to the wireless transceiver 130.

Figure 3:
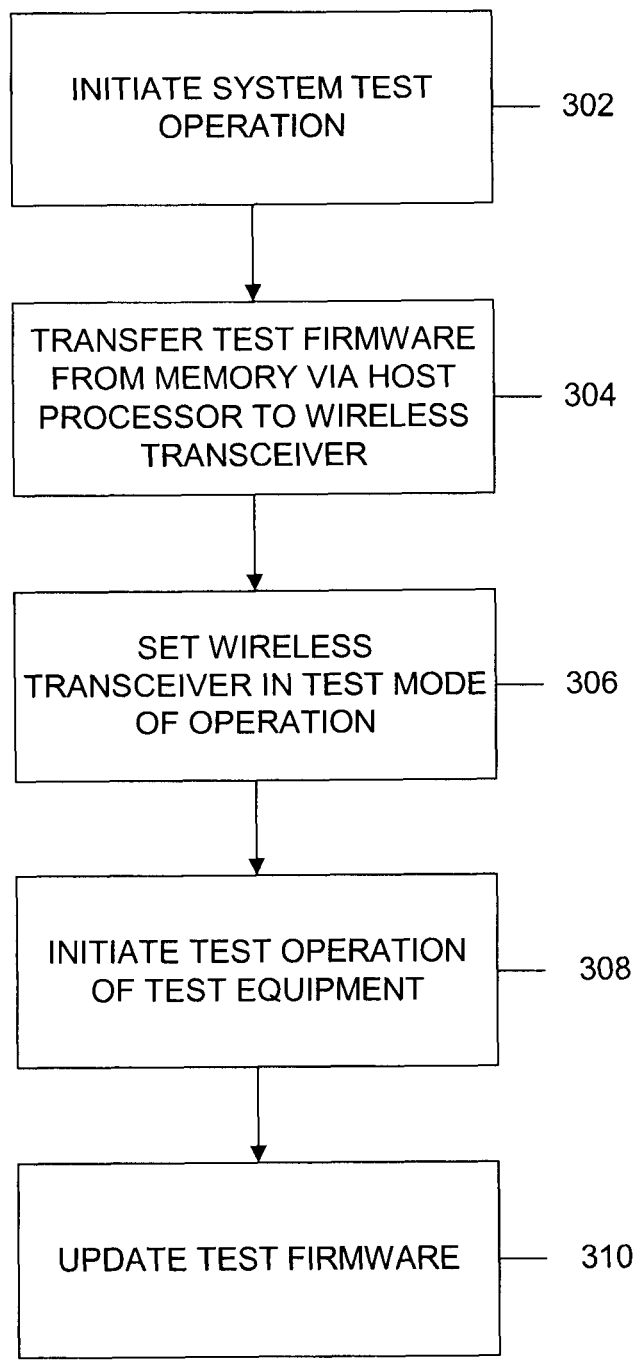
FIG. 3 depicts a method for testing the wireless data communication system of FIG. 1 in accordance with another embodiment of the presently claimed invention.

Referring to FIG. 3, a test method in accordance with another embodiment of the presently claimed invention has a first step 302 of initiating system test operation. This causes the host processor 110 to be prepared for the next step 304 in which the test firmware is transferred from the memory 120 via the host processor 110 to the wireless transceiver 130. As discussed above, the test firmware can include the test flow, or can also be composed of two components, i.e., the test commands and test sequence data. In the next step 306, the wireless transceiver 130 is set in its test mode of operation. As discussed above, this can be done automatically as part of the loading of the test firmware, or can be initiated by an appropriate command sent by the host processor 110 via the interface 111, with such command either initiated by the host processor 110 or conveyed by the host processor 110 in response to its reception from the computer 150.

In the next step 308, actual testing is initiated. As discussed above, this can be in the form of either the wireless transceiver 130 initiating communication with the test equipment 160 over the interface 101, or the test equipment 160, under the control of the computer 150, initiating communication with the wireless transceiver 130 via the interface 101.

Subsequent steps can include a step 310 in which the test firmware is updated, as discussed above, to modify various test settings, parameters or conditions.

As discussed above, a test method in accordance with the present disclosure includes steps for placing the DUT 100 in a test operation mode in conjunction with the external test equipment 160. Following that, there are two general categories of testing: testing of the signal transmit function of the wireless transceiver 130; and testing of the signal reception function of the wireless transceiver 130.

Figure 4:
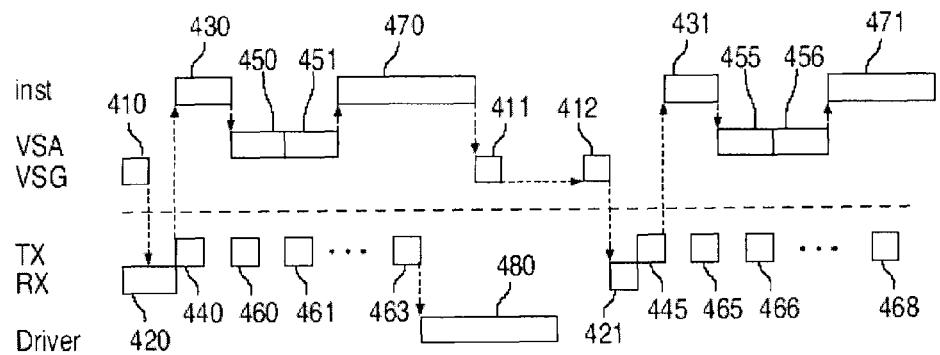
FIG. 4 depicts a test sequence for performing signal transmission testing of the wireless data communication system of FIG. 1 in accordance with one embodiment of the presently claimed invention.

Referring to FIG. 4, one example of a transmit test sequence can be described as follows. Testing begins with the receiver (RX) portion of the DUT 100 awaiting a command 420. The test equipment 160 issues its command 410 (e.g., a GOTO-NEXT command). Following reception of this command, the transmitter (TX) of the DUT 100 transmits an acknowledgment signal 440 indicating it received and understood the command. Following this, the DUT 100 begins transmitting data signals as determined by the test flow. This is represented by signal transmission time slots 460, 461, ... 463. The test flow will determine the number of packets to be transmitted, with such transmitted packets containing the same signal, or multiple signals in the case of a multi-packet transmission.

Following receipt of the acknowledgement 440, the test equipment 160 will wait for a specified time interval 430 to allow the transmitter to settle to its desired operation (e.g., frequency accuracy and power level). Following this time interval 430, the test equipment 160 begins performing measurements 450, 451. Following completion of these measurements 450, 451, the test equipment 160, or alternatively the controller computer 150, after having accessed the data collected by the test equipment 160, analyzes the collected data and prepares to set up the next test sequence 470. Similarly, following completion of its signal transmissions 463, the DUT 100 will prepare for the next portion of the test sequence by processing any necessary operations 480.

When the test equipment 160 or computer 150 has completed processing of the data 470, the next test command (e.g., GOTO-NEXT) is transmitted. The first of such commands 411 may not be received by the DUT 100 if its preparations 480 for the next test have not yet been completed. If so, no acknowledgement signal is received by the test equipment 160. Accordingly, the test equipment 160 will continue to send its commands 412, following which at some point in time one of these commands 412 will be received 421 by the DUT 100 and an acknowledgement 445 will be transmitted by the DUT 100. This will be the start of a new test sequence where the DUT 100 will transmit a new test signal a known number of times 465, 466, . . . 468, and the test equipment 160 will perform the desired measurements 455, 456, followed by further analysis and preparation for subsequent testing 471.

It should be understood that, although unusual in a production test environment, the test equipment 160 may not receive good data from the DUT 100. While this is generally an indication of a bad DUT 100, it may be desirable to repeat the failed test before simply discarding the DUT 100. In such a situation, two possible courses of action exist. According to one, the test equipment 160 can send a different command (e.g., a REPEAT command rather than a GOTO-NEXT command). This is a simple implementation and should be easy for the DUT 100 to identify this different command. However, this can slow testing down as the test equipment 160 may need to load a new command or new data to enable the generation of a new signal. Alternatively, the test equipment 160 can simply not send another command, following which the DUT 100 can interpret this as an indication that the measurement was not successful, in which case the DUT 100 simply repeats the original test.

As noted above, the transmit signals 460, 461, . . . 463, being sent by the DUT 100 can be a single transmit signal, or can be a set of multi-packet signals. Using such multi-packet signals has an advantage that little or no communication is needed between the test equipment 160 and the DUT 100 during calibration, since a solution is generally reached by iteration, as discussed in U.S. patent application Ser. No. 11/161,692, filed Aug. 12, 2005, and entitled "Method for Measuring Multiple Parameters of a Signal Transmitted by a Signal Generator," the disclosure of which is herein incorporated in its entirety by reference.

Figure 5:
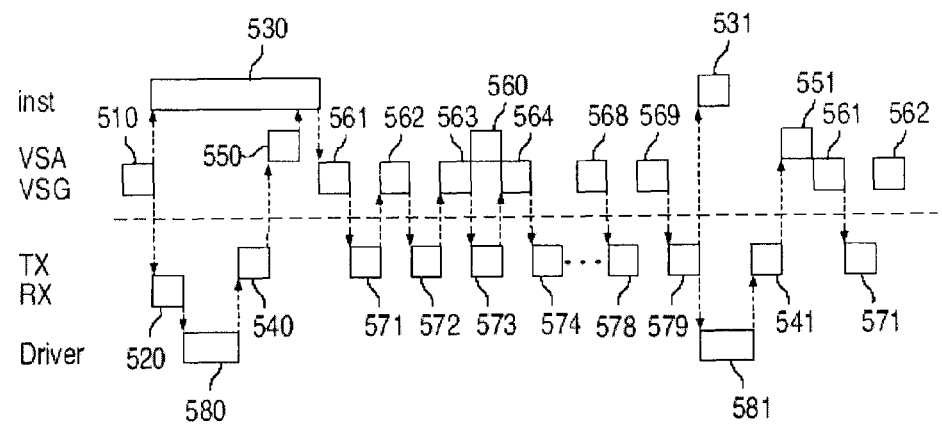
FIG. 5 depicts a test sequence for performing signal reception testing of the wireless data communication system of FIG. 1 in accordance with another embodiment of the presently claimed invention.

Referring to FIG. 5, the expected test flow for receiving signals can be described as follows. This test flow differs from the signal transmission test flow in that it is intended to implement the test such that the DUT 100 need not fully analyze (if at all) the data actually being received from the test equipment 160, but rather simply determine if a valid packet has been received. Accordingly, the test equipment 160 need not issue a test command (e.g., a GOTO-NEXT command) when transitioning from one received test to another. Instead, it is preferable to let the DUT 100 determine when to move on to the next test. This can be done by simply having the DUT 100 continue to the next test when the DUT has received a predetermined number of good signal packets.

If the DUT 100 transmits an acknowledgement whenever it has received a good packet, the test equipment 160 can simply count the number of good packets without requesting such count from the DUT 100, thereby allowing the received signal test flow to progress without additional communications being necessary to simply determine the results of the test, since the test equipment 160 knows how many packets were sent and can determine how many were received by simply counting the number of acknowledgement signals received form the DUT 100. This technique is particularly valid where the test equipment 160 includes test equipment like the VSA and VSG because it is unlikely to have lost acknowledgement signals since the transmitter power of the DUT 100 is generally higher than the transmitter power of the VSG. Hence, it is unlikely that the VSA will miss an acknowledgement signal packet, particularly if the VSA is triggered by the trailing edge of the signal packet transmitted by the VSG. Further, having the VSA receive the acknowledgement packet provides the additional benefit of allowing the switching time of the transmit/receive switch in the DUT 100 to be tested as well.

Referring again to FIG. 5, the test equipment 160 transmits the test command 510. Assuming the previous test was a transmit test, this test command 510 instructs the DUT 100 to initiate the next test which is a receive test. The DUT 100 receives this command 520, which causes the test firmware to enable the receive test 580. When the receiver section of the DUT 100 is ready, an acknowledgement signal is transmitted 540, indicating the readiness of the receiver. This can be important as compared to conventional test methods where packets are sent by the test equipment 160 until the receiver starts receiving such packets. By having the DUT 100 indicate its readiness, the test equipment 160 need only enable its VSA to await reception of the acknowledgment signal from the DUT 100, following which the test equipment 160 can then prepare for receive testing 530.

When the test equipment 160 (e.g., the VSA) receives the acknowledgement signal 540, the test equipment 160 knows that the DUT 100 is ready and begins signal transmission. Accordingly, the test equipment 160 (e.g., the VSG) begins transmitting a predetermined number of signal packets 561, 562, 563, 564, 568, 569, each of which produces a corresponding acknowledgement signal 571, 572, 573, 574, 578, 579. The test equipment 160 receives these acknowledgement packets and increases its internal count for each such packet received. Additionally, as noted above, the transmit/receive switch operation of the DUT 100 can be analyzed by analyzing an interval 560 between a transmitted test signal 563 and the reception of an acknowledgement signal 573. (Using an acknowledgement signal in this manner is advantageous since such a signal is already included in virtually all standard or default transceiver signal sets, thereby avoiding a need for adding another otherwise unnecessary signal or functionality.)

In this example, no packet errors have occurred, so the DUT 100 has received the predetermined number of packets and will move on to the next receive test 581. Similarly, the test equipment 160 knows that the DUT 100 has received all packets based upon the received number of acknowledgement signals and can prepare for the next receive test 531 as well. When the DUT 100 is prepared, an acknowledgement signal is transmitted 541 indicating such readiness, and the test equipment 160, following reception of this acknowledgement 551, begins to transmit packets for the next test 561. In the event that the DUT 100 has not received packets within a predetermined time interval, it can retransmit its acknowledgement 541, e.g., where the DUT 100 becomes ready faster than the test equipment 160 for the next test.

Figure 6:
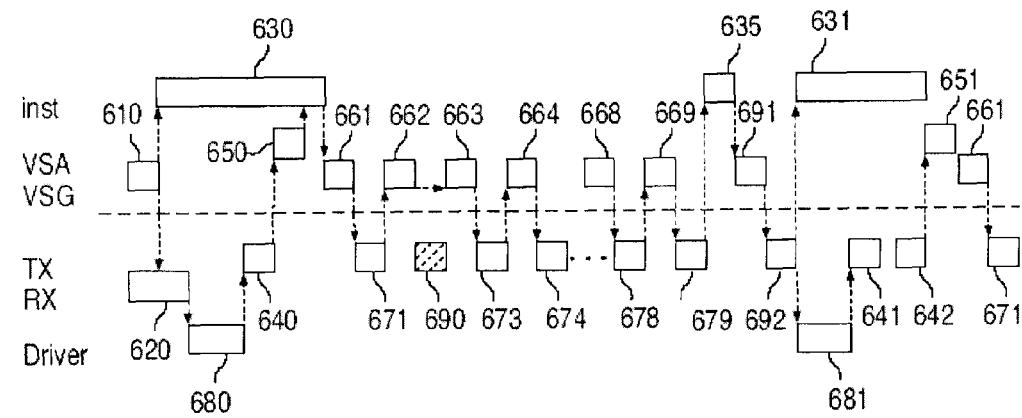
FIG. 6 depicts a test sequence for performing signal reception testing of the wireless data communication system of FIG. 1 in accordance with another embodiment of the presently claimed invention.

Referring to FIG. 6, if a packet error is encountered, the DUT 100 does not receive its full predetermined number of good packets. As shown, the test flow begins from where the previous test was a transmit test. The VSG of the test equipment 160 sends the test command 610 indicating the start of the new operation or the end of the previous operation. The DUT 100 receives this command 620 and prepares to enable itself for receive testing 680. When it is ready, the DUT 100 sends its acknowledgement that it is ready to receive 640. This acknowledgement is received 650 by the test equipment 160, following which when the test equipment 160 is ready, e.g., completing its internal setup 630, it begins transmitting the predetermined number of packets 661, 662, 663, 664, 668, 669. In response to this, the DUT 100 transmits an acknowledgement 671, 673, 674, 678, 679 for each of the good packets it has received.

As shown, one of the packets 662 was not received by the DUT 100. Accordingly, no corresponding acknowledgement was transmitted by the DUT 100 as illustrated by an empty received packet 690 in the Figure. Following completion of the transmit sequence, the test equipment 160 knows how many acknowledgement packets it received, and since one packet was apparently missed 690, the test equipment 160 knows that the receiver of the DUT 100 is still awaiting at least one more packet before it can continue to the next test in the test flow. Accordingly, the test equipment 160 will compute 635 the number of additional packets needed to be received by the DUT 100, and begin transmitting 691 the necessary number of packets.

Following reception of this missing packet, the DUT 100 transmits an acknowledgement signal 692, and begins preparing for the next test operation 681. When it is ready, the DUT 100 will send another acknowledgement to the test equipment 160. In this example, the test equipment 160 is not yet ready when the DUT 100 is ready. Accordingly, the DUT 100 sends it acknowledgement signal 641, but since the test equipment 160 is not yet ready and does not respond, the DUT 100, after a predetermined time interval, will send another acknowledgement signal 642. The test equipment 160 is now ready and following reception of this acknowledgement signal 651 begins to transmit more data packets 661, to which the DUT 100 responds by sending corresponding acknowledgement packets 671.

As discussed above, the signals being transmitted for testing purposes can be multi-packet signals, in which case it may be desirable to have the DUT 100 respond only to certain types of data packets. For example, transmitting different data packets at different power levels can allow testing of actual receiver sensitivity to be performed (where certain packets are expected to not be received) without requiring the transmitter to send many more packets to make the receiver meet the desired packet number for progression to the next test.

Figure 7:
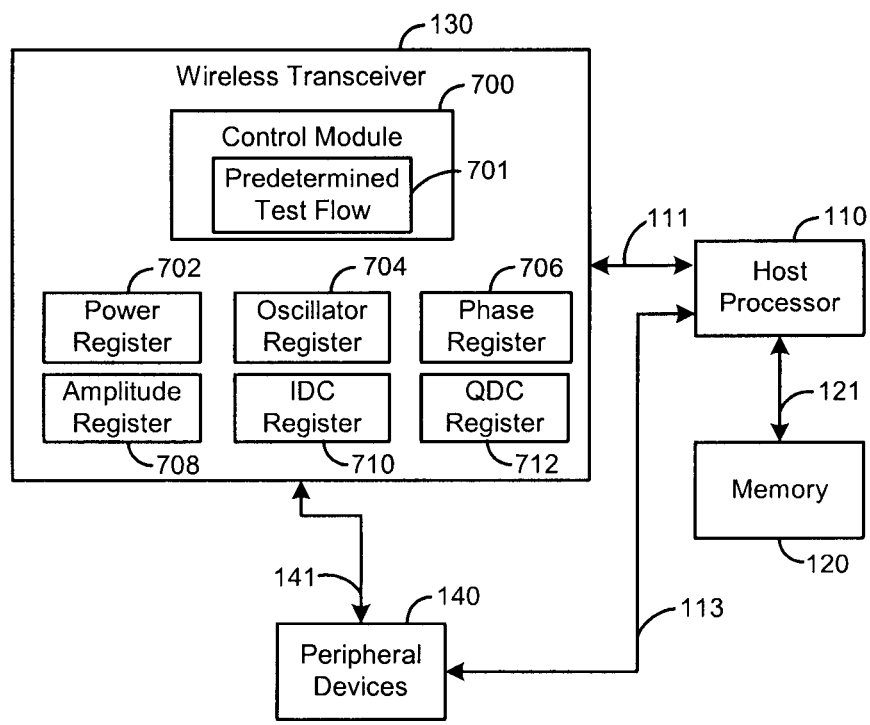
FIG. 7 is an exemplary block diagram of a wireless transceiver of the wireless data communication system.

Referring now to FIG. 7, an exemplary block diagram of the wireless transceiver 130 is depicted. The wireless transceiver 130 includes a control module 700 that is operative to execute a predetermined test flow 701 and a plurality of calibration registers that can be adjusted to calibrate the wireless transceiver 130. The calibration registers can include a power register 702, a oscillator register 704, a phase register 706, an amplitude register 708, a in-phase DC offset (IDC) register 710, and a quadrature DC offset (QDC) register 712. If desired, the wireless transceiver 130 can include other suitable calibration registers.

Calibration of the wireless transceiver 130 typically involves finding a close to optimal setting for each of the calibration registers 702, 704, 706, 70, 710, 712 to adjust performance of the wireless transceiver 130. Therefore, the predetermined test flow 701 can include a predetermined calibration test flow that steps through the different possible values (or a subset thereof) for each register 702, 704, 706, 70, 710, 712. The test equipment 160 can measure packets transmitted from the DUT 100 according to the predetermined test flow 701. The measurements can be used to estimate error for each register and ultimately to determine an optimal value for each register 702, 704, 706, 70, 710, 712. In addition, if the predetermined test flow 701 includes a predetermined number of register control values, the test equipment 160 can identify values close to the expected register values based on the predetermined test flow 701 and can capture packets close to the expected register values while ignoring other packets transmitted from the DUT 100.

An advantage of having a predetermined test flow spanning all possible combinations is that a calibration of the wireless transceiver 130 can be repeated when a non-conclusive result is obtained (e.g. from a wrong initial estimate of the expected register value) from the first sequence. The predetermined test flow can simply be repeated and the test equipment 160 can identify and capture different packets close the new expected register settings based on the results from the failed test. This can be very advantageous when testing a first wireless transceiver in a manufacturing environment since the expected register values may not be correct.

Exemplary transmitter calibration of the wireless transceiver can include transmit power calibration, oscillator (e.g. crystal) frequency centering, IQ-mismatch calibration, and DC offset (i.e., carrier leakage) calibration. In some embodiments, there are 64 control values for each calibration register 702, 704, 706, 70, 710, 712. The transmit power can be calibrated by cycling through the values (or subset of the values) of the power register 702. The oscillator can be calibrated by cycling through the values (or subset of the values) of the oscillator register 704. IQ-mismatch typically includes a phase offset and amplitude offset. Therefore, IQ-mismatch can be calibrated by cycling through the values (or subset of the values) of the phase register 706 and the amplitude register 708. The DC offset (i.e., carrier leakage) can be calibrated by cycling through the values (or subset of the values) of the IDC register 710 and the QDC register 712.

To reduce testing time, the predetermined test flow 701 can cycle through the possible values for each register 702, 704, 706, 70, 710, 712 in steps of 2, 3, 4 or any other suitable step size. Alternatively, the predetermined test flow 701 can cycle through a subset of the total values for each register 702, 704, 706, 70, 710, 712 (e.g., cycle through 40 out of the 64 total values).

Figure 8:
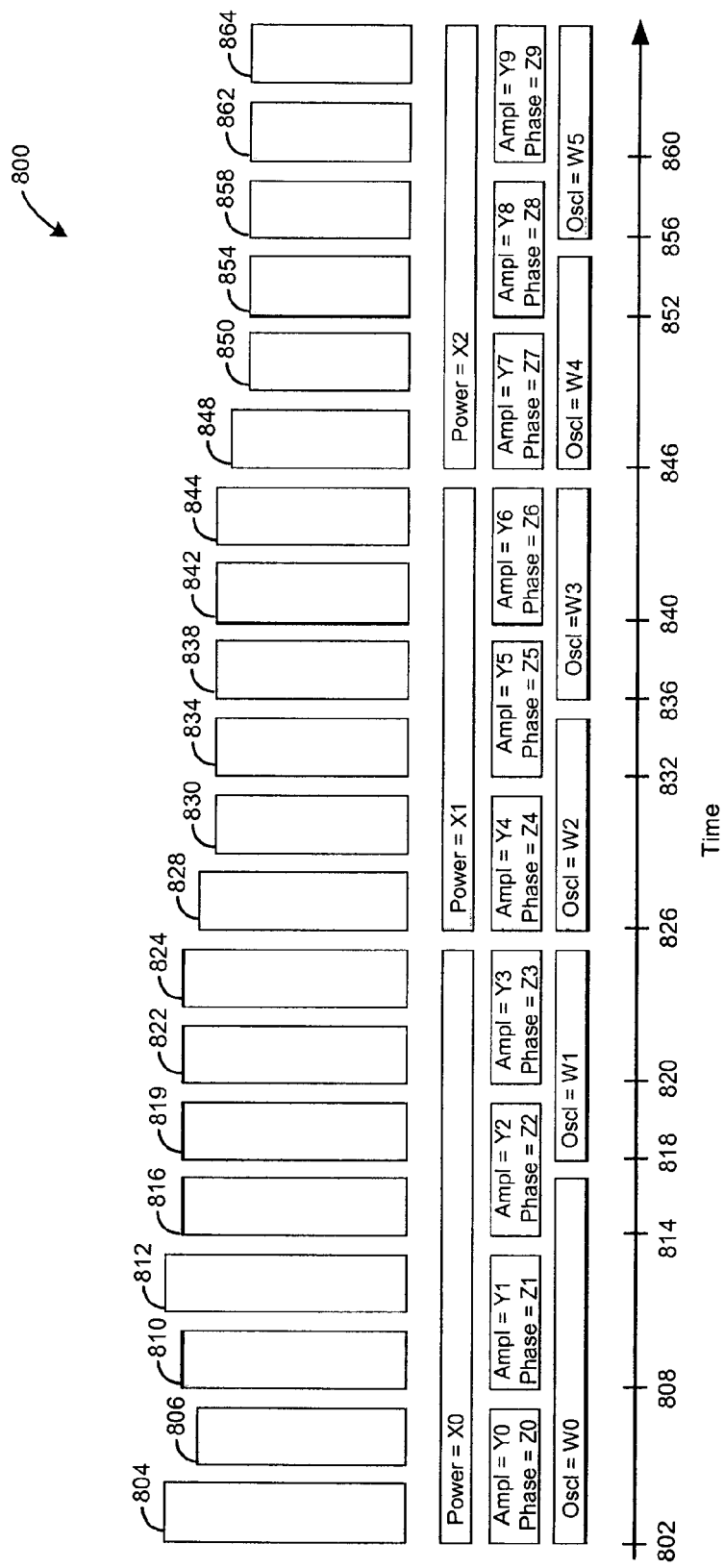
FIG. 8 is an exemplary timing diagram the wireless data communication system performing a predetermined test flow corresponding to a calibration test.

Referring now to FIG. 8, an exemplary timing diagram of one example of the predetermined test flow 701 that can be performed by the wireless transceiver 130 is generally identified at 800. In this example, the DUT 100 transmits the predetermined test flow 701 that is used to calibrate the wireless transceiver 130. The DUT 100 periodically adjusts one or more of the registers and transmits calibration packets based on the predetermined test flow. In some embodiments, the DUT 100 cycles through all possible values of each register during the predetermined sequence. However, as previously noted, the DUT 100 can cycle through the possible value in steps of 2, 3, 4 or other suitable step size and/or the DUT 100 can cycle through a subset of all the possible values.

At time 802, the DUT 100 sets the power register 702 to a first power value (e.g., X0), the amplitude register 708 to a first amplitude value (e.g., Y0), the phase register 706 to a first phase value (e.g., Z0), and the oscillator register 704 to a first oscillator value (e.g., W0). Once the registers have been adjusted, the DUT 100 transmits calibration packet 804 at time 802. The DUT 100 subsequently transmits calibration packet 806. As illustrated packet 806 has a transmitted power that is less than packet 804 due to the power settling when the power register of the wireless transceiver 130 is initially adjusted.

At time 808, the DUT 100 sets the amplitude register 708 to a second value (e.g., Y1) and the phase register 706 to a second value (e.g., Z1). Once the registers have been adjusted, the DUT 100 transmits calibration packet 810. The DUT 100 subsequently transmits packet 812.

At time 814, the DUT 100 sets the amplitude register 708 to a third value (e.g., Y2) and the phase register 706 to a third value (e.g., Z2). Once the registers have been adjusted, the DUT 100 transmits calibration packet 816. As shown, packets 804 and 812 have a transmitted power that is greater than the final transmit power produced by the first power value (e.g., X0) and packets 806 and 810 are less than the final transmit power due to the power settling when the power register 702 is initially adjusted.

At time 818, the DUT 100 sets the oscillator register 704 to a second value (e.g., W1). Once the oscillator register 704 has been adjusted to the second value, the DUT 100 transmits calibration packet 819.

At time 820, the DUT 100 sets the amplitude register 708 to a fourth value (e.g., Y3) and the phase register 706 to a fourth value (e.g., Z3). Once the registers have been adjusted, the DUT 100 transmits calibration packet 822. The DUT 100 subsequently transmits packet 824.

At time 826, the DUT 100 sets the power register 702 to a second power value (e.g., X1), the amplitude register 708 to a fifth amplitude value (e.g., Y4), the phase register 706 to a fifth phase value (e.g., Z4), and the oscillator register 704 to a third oscillator value (e.g., W2). In addition, the DUT 100 transmits calibration packet 828 at time 826. The DUT 100 subsequently transmits calibration packet 830.

At time 832, the DUT 100 sets the amplitude register 708 to a sixth value (e.g., Y5) and the phase register 706 to a sixth value (e.g., Z5). Once the registers have been adjusted, the DUT 100 transmits calibration packet 834.

At time 836, the DUT 100 sets the oscillator register 704 to a fourth value (e.g., W3). Once the oscillator register 704 has been adjusted to the fourth value, the DUT 100 transmits calibration packet 838.

At time 840, the DUT 100 sets the amplitude register 708 to a seventh value (e.g., Y6) and the phase register 706 to a seventh value (e.g., Z6). Once the registers have been adjusted, the DUT 100 transmits calibration packet 842. The DUT 100 subsequently transmits calibration packet 844.

At time 846, the DUT 100 sets the power register 702 to a third power value (e.g., X2), the amplitude register 708 to an eighth amplitude value (e.g., Y7), the phase register 706 to an eighth phase value (e.g., Z7), and the oscillator register 704 to a fifth oscillator value (e.g., W4). In addition, the DUT 100 transmits calibration packet 848 at time 846. The DUT 100 subsequently transmits calibration packet 850.

At time 852, the DUT 100 sets the amplitude register 708 to a ninth value (e.g., Y8) and the phase register 706 to a ninth value (e.g., Z8). Once the registers have been adjusted, the DUT 100 transmits calibration packet 854.

At time 856, the DUT 100 sets the oscillator register 704 to a sixth value (e.g., W5). Once the oscillator register 704 has been adjusted to the sixth value, the DUT 100 transmits calibration packet 858.

At time 860, the DUT 100 sets the amplitude register 708 to a tenth value (e.g., Y9) and the phase register 706 to a tenth value (e.g., Z9). Once the registers have been adjusted, the DUT 100 transmits calibration packet 862. The DUT 100 subsequently transmits calibration packet 864.

The DUT 100 continues to periodically adjust the values of the registers until the DUT 100 has cycled through all possible calibration values for each register. In addition, although not illustrated, the DUT 100 can also periodically adjust the IDC register 710 and the QDC register in a similar manner until the DUT 100 has cycled through all possible calibration values for each register.

Figure 9:
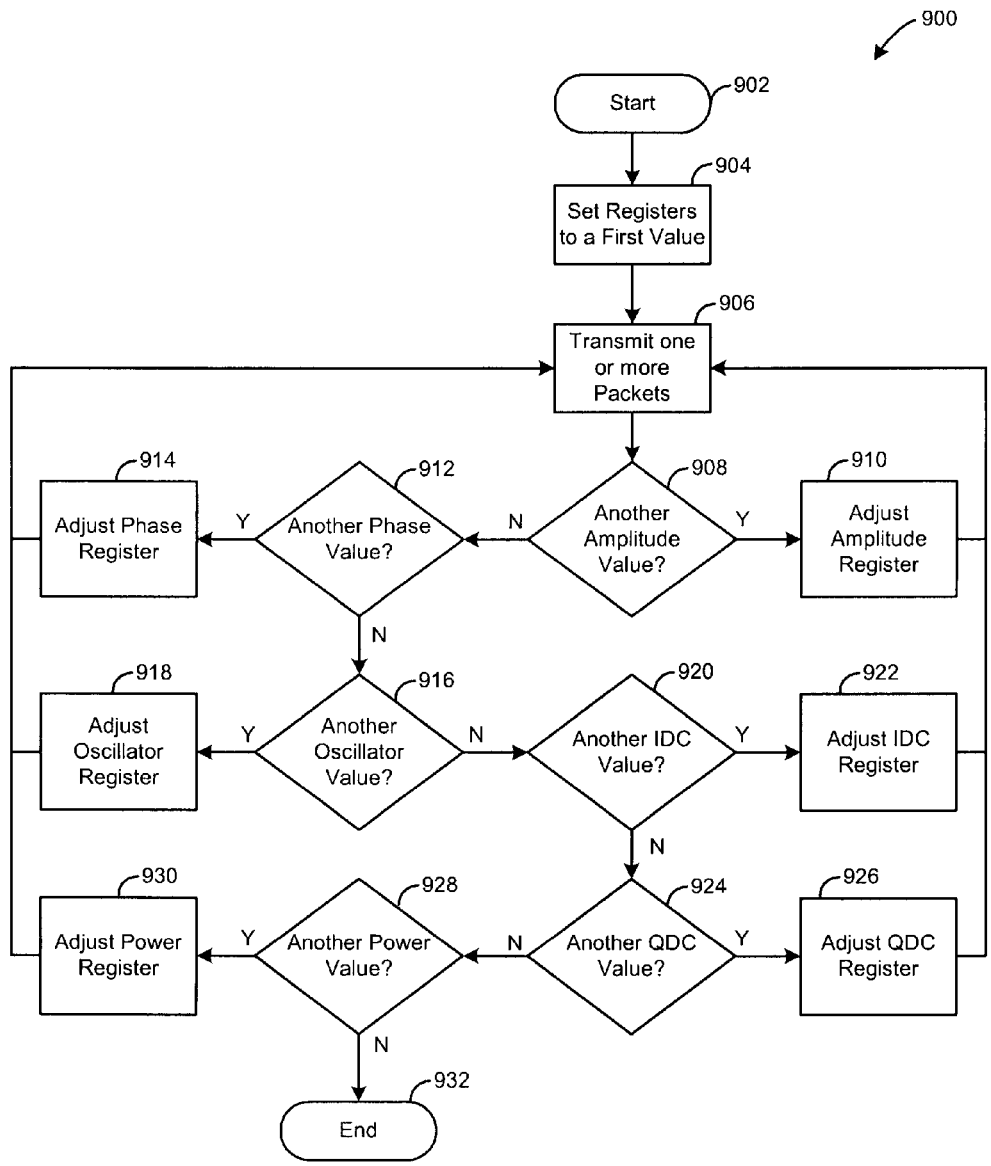
FIG. 9 is a flowchart depicting exemplary steps that can be taken by the wireless communication system when performing the predetermined test flow.

Referring now to FIG. 9, exemplary steps that can be taken by the DUT 100 when performing the predetermined test flow 701 to calibrate the wireless transceiver 130 are generally identified at 900. In general the DUT 100, adjusts one or more calibration registers and then subsequently transmits one or more packets until at least one packet has been transmitted using all values (or a subset thereof) of the calibration registers.

In this example, the process starts in step 902 when the predetermined test flow 701 is initiated. In step 904, the DUT 100 sets the registers 702, 704, 706, 708, 710, 712 to a first value. In step 906, the DUT 100 transmits one or more calibration packets. In step 908, the DUT 100 determines whether all possible calibration values (or a subset thereof) of the amplitude register 708 have been transmitted. If all possible amplitude calibration values (or a subset thereof) have not been transmitted, the DUT 100 adjusts the amplitude register 708 to another value in step 910 and then transmits one or more calibration packets in step 906.

If the DUT 100 determines that all possible calibration values (or a subset thereof) of the amplitude register 708 have been transmitted, the DUT 100 determines whether all possible calibration values (or a subset thereof) of the phase register 706 have been transmitted in step 912. If all possible phase calibration values (or a subset thereof) have not been transmitted, the DUT 100 adjusts the phase register 706 to another value in step 914 and then transmits one or more calibration packets in step 906.

If the DUT 100 determines that all possible calibration values (or a subset thereof) of the phase register 706 have been transmitted, the DUT 100 determines whether all possible calibration values (or a subset thereof) of the oscillator register 704 have been transmitted in step 916. If all possible oscillator calibration values (or a subset thereof) have not been transmitted, the DUT 100 adjusts the oscillator register 704 to another value in step 918 and then transmits one or more calibration packets in step 906.

If the DUT 100 determines that all possible calibration values (or a subset thereof) of the oscillator register 704 have been transmitted, the DUT 100 determines whether all possible calibration values (or a subset thereof) of the IDC register 710 have been transmitted in step 920. If all possible IDC calibration values (or a subset thereof) have not been transmitted, the DUT 100 adjusts the IDC register 710 to another value in step 922 and then transmits one or more calibration packets in step 906.

If the DUT 100 determines that all possible calibration values (or a subset thereof) of the IDC register 710 have been transmitted, the DUT 100 determines whether all possible calibration values (or a subset thereof) of the QDC register 712 have been transmitted in step 924. If all possible QDC calibration values (or a subset thereof) have not been transmitted, the DUT 100 adjusts the QDC register 712 to another value in step 926 and then transmits one or more calibration packets in step 906.

If the DUT 100 determines that all possible calibration values (or a subset thereof) of the QDC register 712 have been transmitted, the DUT 100 determines whether all possible calibration values (or a subset thereof) of the power register 702 have been transmitted in step 928. If all possible power calibration values (or a subset thereof) have not been transmitted, the DUT 100 adjusts the power register 702 to another value in step 930 and then transmits one or more calibration packets in step 906. However, if all possible power calibration values (or a subset thereof) have been transmitted, the process ends in step 932.

Figure 10:
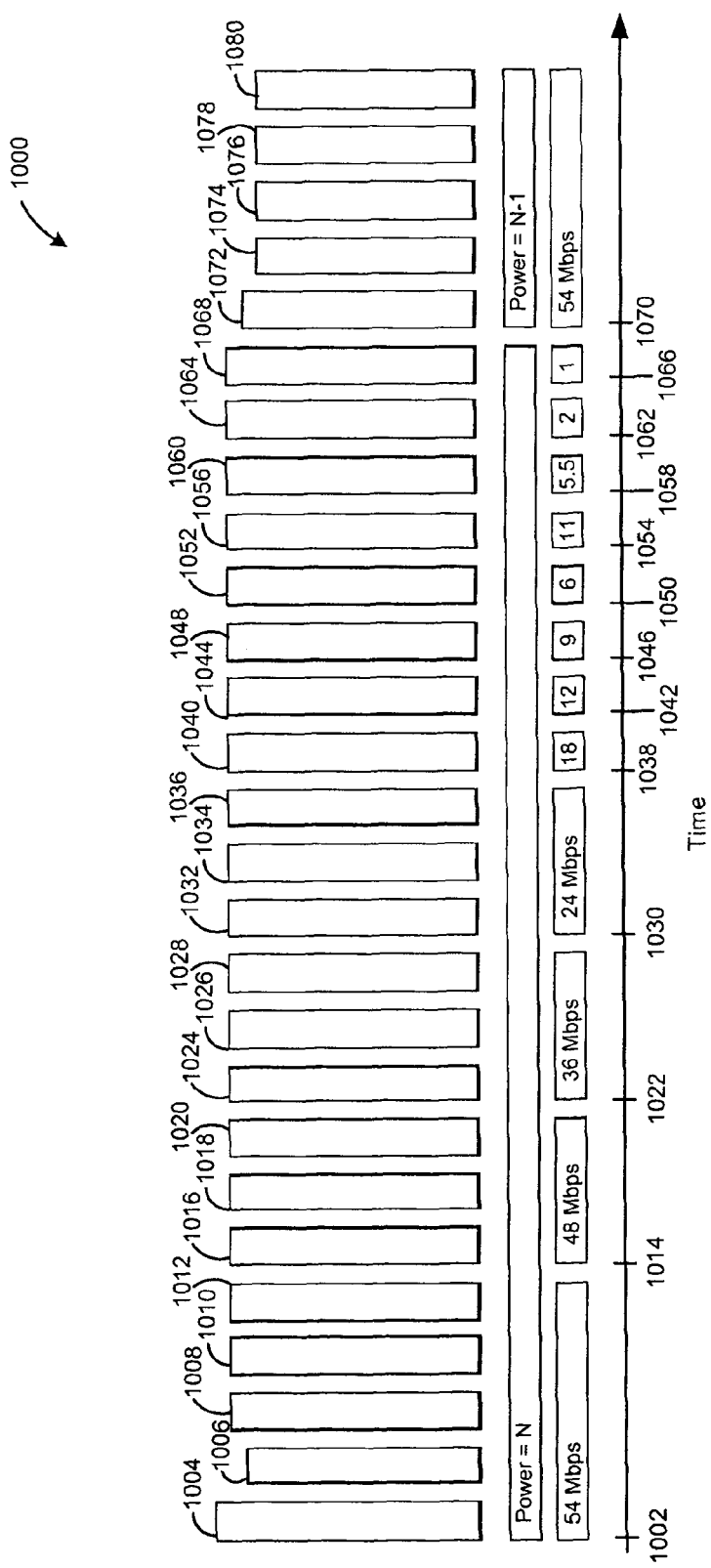
FIG. 10 is an exemplary timing diagram of the wireless data communication system performing a predetermined test flow corresponding to a verification test.

Referring now to FIG. 10, an exemplary timing diagram of one example of the predetermined test flow 701 that can be implemented by the wireless transceiver 130 is generally identified at 1000. In this example, the DUT 100 the predetermined test flow 701 is used to verify operation of the wireless transceiver 130. More specifically, the DUT 100 periodically adjusts a data rate of the wireless transceiver 130 and transmits one or more verification test packets for each data rate supported by the wireless transceiver 130. When adjusting the data rate, the wireless transceiver 130 can also adjust a transmit power and/or modulation type of the wireless transceiver 130. In addition, since transmit quality is typically reduced when transmitting at lower data rates, many systems increase the transmit power of the wireless transceiver 130 when transmitting at lower data rates. Therefore, in order to verify all supported data rates, the DUT 100 can periodically cycle through all supported data rates at each transmit power based on the predetermined test flow 701.

At time 1002, the DUT 100 adjusts the data rate of the wireless transmitter 130 to 54 Mbps. More specifically, the DUT 100 adjusts the transmit power of the wireless transceiver 130 to a first power value (e.g., N) and the modulation type of the wireless transceiver 130 to 64-QAM. In addition, the DUT 100 transmits verification packet 1004 at time 1002. The DUT 100 subsequently transmits verification packets 1006, 1008, 1010, 1012. As illustrated packet 1002 has a transmitted power that is greater than the target transmit power (e.g., N) and packet 1004 has a transmitted power that is less than the target transmit power due to the power settling when the transmit power of the wireless transceiver 130 is initially adjusted. Packets 1008, 1010, 1012 can be used for error vector magnitude (EVM) averaging, which is known in the art. Although only three packets (e.g., 1008, 1010, 1012) are used in this example, skilled artisans will appreciate that more packets can be used such as, for example, 20 packets as required by IEEE 802.11.

At time 1014, the DUT 100 adjusts the data rate of the wireless transmitter 130 to 48 Mbps. To transmit at 48 Mbps, the wireless transceiver 130 uses the same modulation type, therefore the DUT 100 does not need to adjust the modulation type. The DUT 100 transmits verification packet 1016 at time 1014 and subsequently transmits verification packets 1018 and 1020 thereafter.

At time 1022, the DUT 100 adjusts the data rate of the wireless transmitter 130 to 36 Mbps. More specifically, the DUT 100 adjusts the modulation type of the wireless transceiver 130 to 16-QAM. The DUT 100 transmits verification packet 1024 at time 1022 and subsequently transmits verification packets 1026 and 1026 thereafter.

At time 1030, the DUT 100 adjusts the data rate of the wireless transmitter 130 to 24 Mbps. To transmit at 24 Mbps, the wireless transceiver 130 uses the same modulation type, therefore the DUT 100 does not need to adjust the modulation type. The DUT 100 transmits verification packet 1032 at time 1030 and subsequently transmits verification packets 1034 and 1036 thereafter.

At time 1038, the DUT 100 adjusts the data rate of the wireless transmitter 130 to 18 Mbps. In order to adjust the data rate to 18 Mbps, the DUT 100 adjusts the modulation type of the wireless transceiver 130 to QPSK. The DUT 100 transmits verification packet 1040 at time 1038.

At time 1042, the DUT 100 adjusts the data rate of the wireless transmitter 130 to 12 Mbps. To transmit at 12 Mbps, the wireless transceiver 130 uses the same modulation type, therefore the DUT 100 does not need to adjust the modulation type. The DUT 100 transmits verification packet 1044 at time 1042.

At time 1046, the DUT 100 adjusts the data rate of the wireless transmitter 130 to 9 Mbps. In order to adjust the data rate to 9 Mbps, the DUT 100 adjusts the modulation type of the wireless transceiver 130 to BPSK. The DUT 100 transmits verification packet 1048 at time 1046.

At time 1050, the DUT 100 adjusts the data rate of the wireless transmitter 130 to 6 Mbps. To transmit at 6 Mbps, the wireless transceiver 130 uses the same modulation type, therefore the DUT 100 does not need to adjust the modulation type. The DUT 100 transmits verification packet 1052 at time 1050.

At time 1054, the DUT 100 adjusts the data rate of the wireless transmitter 130 to 11 Mbps. In order to adjust the data rate to 11 Mbps, the DUT 100 adjusts the modulation type of the wireless transceiver 130 to DSSS. The DUT 100 transmits verification packet 1056 at time 1054. Although only one packet is transmitted in the example, skilled artisans will appreciate that more than one packet can be transmitted in accordance with the present disclosure.

At time 1058, the DUT 100 adjusts the data rate of the wireless transmitter 130 to 5.5 Mbps. To transmit at 5.5 Mbps, the wireless transceiver 130 uses the same modulation type, therefore the DUT 100 does not need to adjust the modulation type. The DUT 100 transmits verification packet 1060 at time 1058. Although only one packet is transmitted in the example, skilled artisans will appreciate that more than one packet can be transmitted in accordance with the present disclosure.

At time 1062, the DUT 100 adjusts the data rate of the wireless transmitter 130 to 2 Mbps. To transmit at 2 Mbps, the wireless transceiver 130 uses the same modulation type, therefore the DUT 100 does not need to adjust the modulation type. The DUT 100 transmits verification packet 1064 at time 1062. Although only one packet is transmitted in the example, skilled artisans will appreciate that more than one packet can be transmitted in accordance with the present disclosure.

At time 1066, the DUT 100 adjusts the data rate of the wireless transmitter 130 to 1 Mbps. To transmit at 1 Mbps, the wireless transceiver 130 uses the same modulation type, therefore the DUT 100 does not need to adjust the modulation type. The DUT 100 transmits verification packet 1068 at time 1066. Although only one packet is transmitted in the example, skilled artisans will appreciate that more than one packet can be transmitted in accordance with the present disclosure.

The process periodically repeats for each transmit power level (or a subset thereof) of the wireless transmitter 130. For example, the DUT 100 adjusts the data rate of the wireless transmitter 130 to 54 Mbps at time 1070. More specifically, the DUT 100 adjusts the transmit power of the wireless transceiver 130 to a second power value (e.g., N−1) and the modulation type of the wireless transceiver 130 to 64-QAM. In addition, the DUT 100 transmits verification packet 1072 at time 1070. The DUT 100 subsequently transmits verification packets 1074, 1076, 1078, and 1080. As illustrated packet 1072 has a transmitted power that is greater than the target transmit power (e.g., N−1) due to the power settling when the transmit power of the wireless transceiver 130 is initially adjusted.

Figure 11:
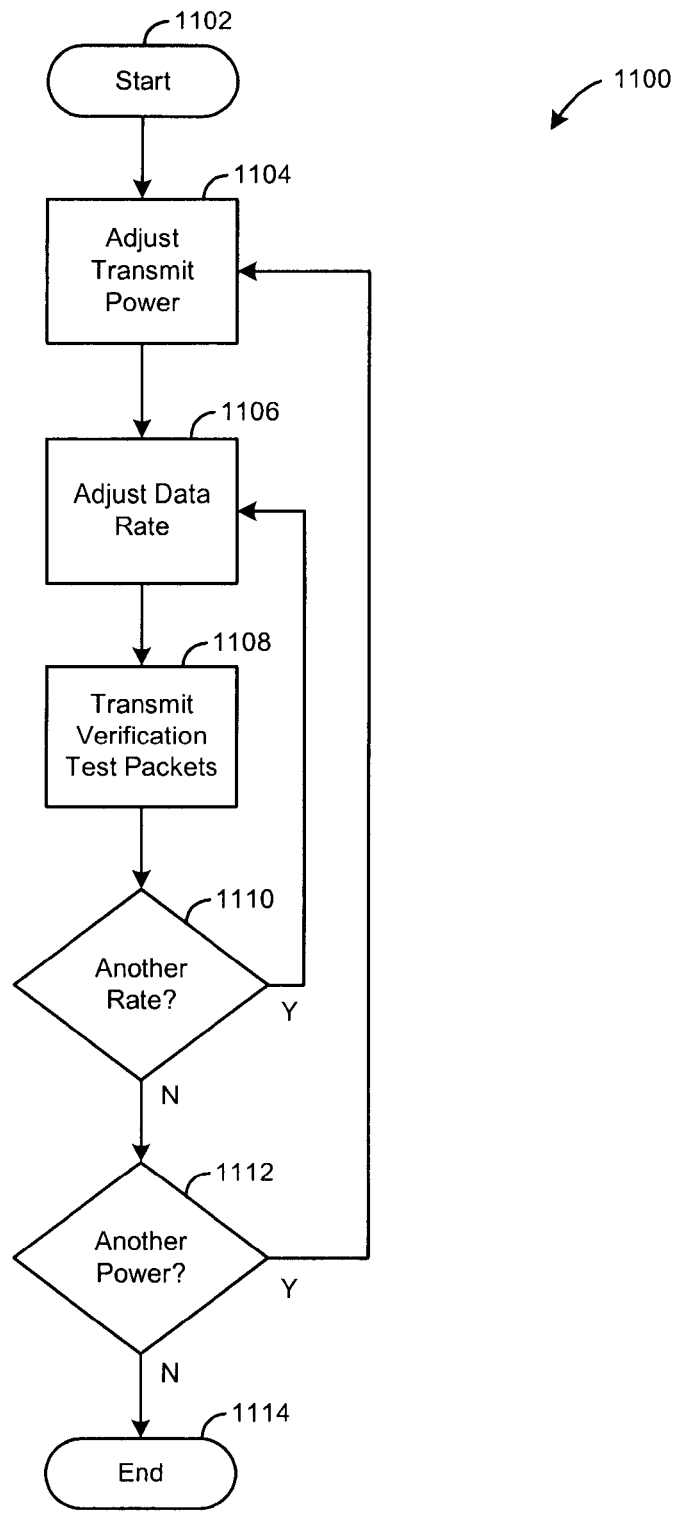
FIG. 11 is a flowchart depicting exemplary steps that can be taken by the wireless data communication system when performing the verification test.

Referring now to FIG. 11, exemplary steps that can be taken by the DUT 100 when performing the verification test are generally identified at 1100. The process starts in step 1102 when the verification test is initiated. In step 1104, the DUT 100 adjusts the transmit power of the wireless transceiver 130 to, for example, a first transmit power. In step 1106, the DUT 100 adjusts the data rate of the wireless transceiver 130 to, for example, a first supported data rate. In step 1108, the DUT 100 transmits one or more verification packets.

In step 1110, the DUT 100 determines whether another supported data rate needs to be verified. If another data rate need to be verified, the process returns to step 1106 and the DUT 100 adjusts the data rate to the next supported data rate. However, if another data rate does not need to be verified (e.g., all supported data rates, or a subset thereof, have been tested), the DUT 100 determines whether another transmit power level needs to be verified according to the predetermined test flow 701 in step 1112.

If another transmit power level needs to be verified, the process returns to step 1104 and the DUT 100 adjusts the transmit power level to the next power level according to the predetermined test flow. However, if another transmit power level does not need to be verified (e.g., all supported transmit powers, or a subset thereof, have been tested), the process ends in step 1114.

Figure 12:
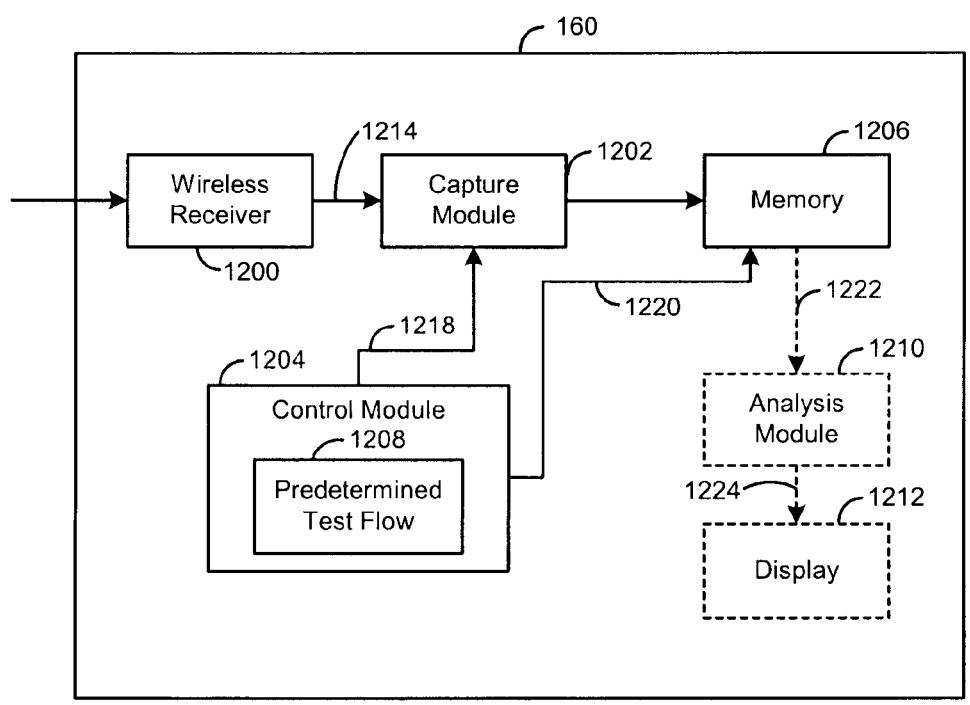
FIG. 12 is an exemplary block diagram of a portion of test equipment that can be used to test the wireless data communication system.

Referring now to FIG. 12, an exemplary block diagram of a portion of the test equipment 160 is depicted. The test equipment 160 includes a wireless receiver 1200, a data capture module 1202 (e.g., sample-and-hold circuitry and analog-to-digital signal conversion circuitry), a control module 1204, and memory 1206. The control module 1204 includes a predetermined test flow 1208 that corresponds to the predetermined test flow 701 of the DUT 100. In some embodiments, the test equipment 160 also includes an analysis module 1210 and a display 1212. In other embodiments, the analysis module 1210 and display 1212 are external to the test equipment 160 and can be included in, for example, the computer 150.

When the predetermined test flow 701, 1208 is initiated (e.g., the calibration and/or the verification predetermined test flow), the test equipment 160 selectively captures test packets transmitted from the DUT 701 based on the predetermined test flow 701, 1208. More specifically, the wireless receiver 1200 receives one or more test packets from the DUT 100. The control module 1208 selectively controls the capture module 1202 to capture one or more of the test packets from an incoming data stream 1214 based on the predetermined test flow 1208, which corresponds with the predetermined test flow 701 of the DUT 100. The captured data 1216 is stored in memory 1206. The captured data 1222 is retrieved from the memory 1206 and transferred to the analysis module 1210 (e.g., a microprocessor and associated support circuitry) either locally within the test equipment or remotely in an external computer, all of which are well known in the art. The results 1224 of the data analysis can then be made available for viewing on the display 1212 by the user (not shown).

Figure 13:
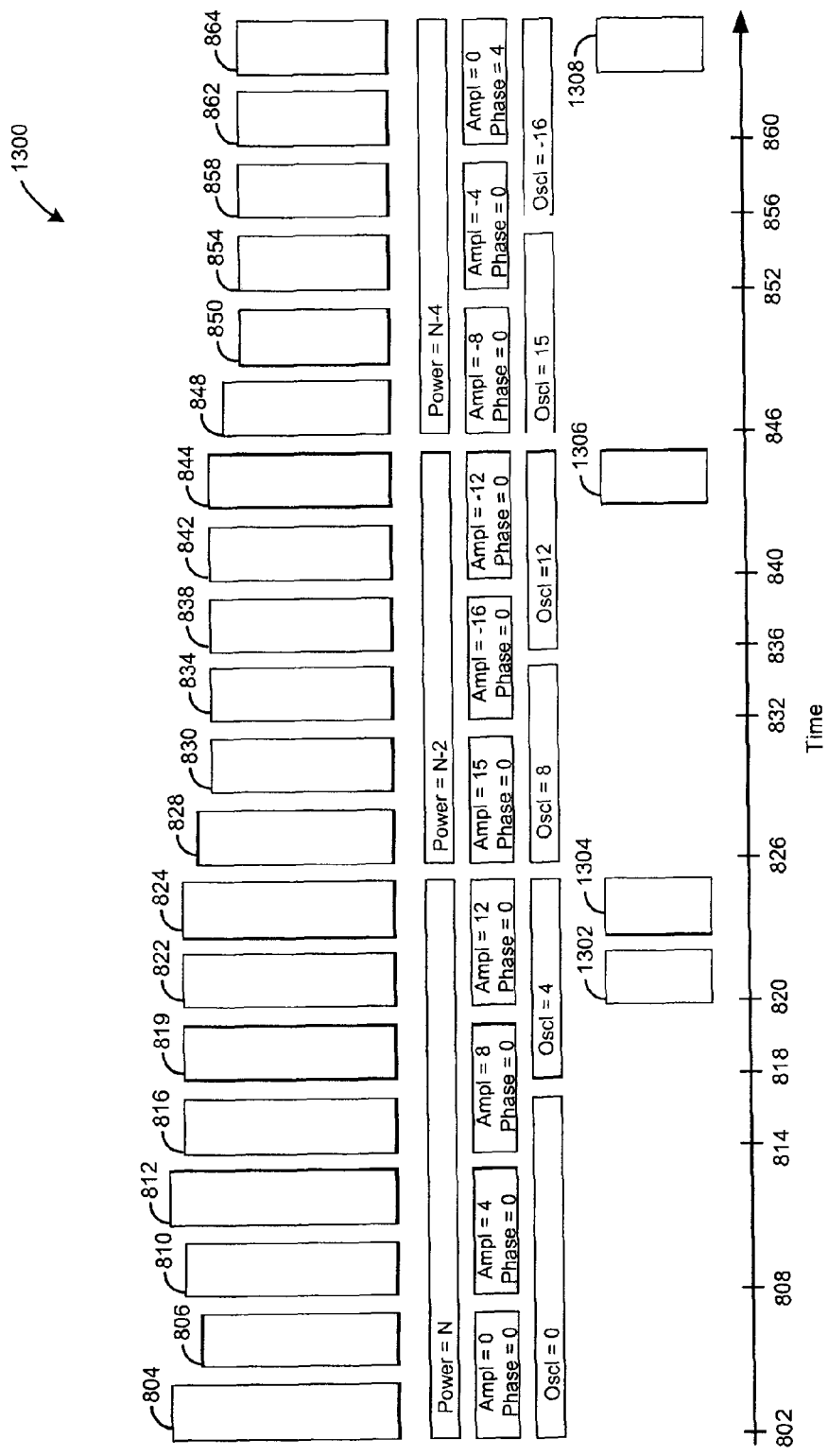
FIG. 13 is an exemplary timing diagram of the test equipment selectively capturing one or more calibration test packets transmitted from the wireless data communication system.

Referring now to FIG. 13, an exemplary timing diagram of one example of the test equipment 160 selectively capturing one or more packets based on the predetermined test flow 701, 1208 is generally identified at 1300. In this example, the DUT 100 transmits one or more test packets based on the predetermined test flow 701 for calibrating the wireless transceiver 130. The test equipment 160 selectively captures the one or more test packets based on the predetermined test flow 701, 1208 and predetermined expected values for each of the calibration registers 702, 704, 706, 708, 710, 712. The predetermined expected values can be based on previous calibration test results.

The test equipment 160 selectively captures the one or more test packets transmitted from the DUT 100 having characteristics closest to the expected values. More specifically, the test equipment 160 selectively captures the one or more test packets having characteristics closest to the expected values based on the predetermined test flow 701, 1208. For example, if the amplitude register 708 has an expected value of 13 and the phase register 706 has an expected value of 0, the test equipment 160 can capture packets 822 and 824 during time intervals 1302 and 1304, respectively, since they are the closest to the respective expected values. If, for example, the oscillator register 704 has an expected value of −11, the test equipment 160 can capture packet 844 during time interval 1306 since packet 844 is closest to the expected value for the oscillator calibration. Similarly, if, for example, the power register 702 has an expected value of N−4, the test equipment 160 can capture packet 864 during time interval 1308 since packet 864 is closest to the expected value for the power calibration.

Figure 14:
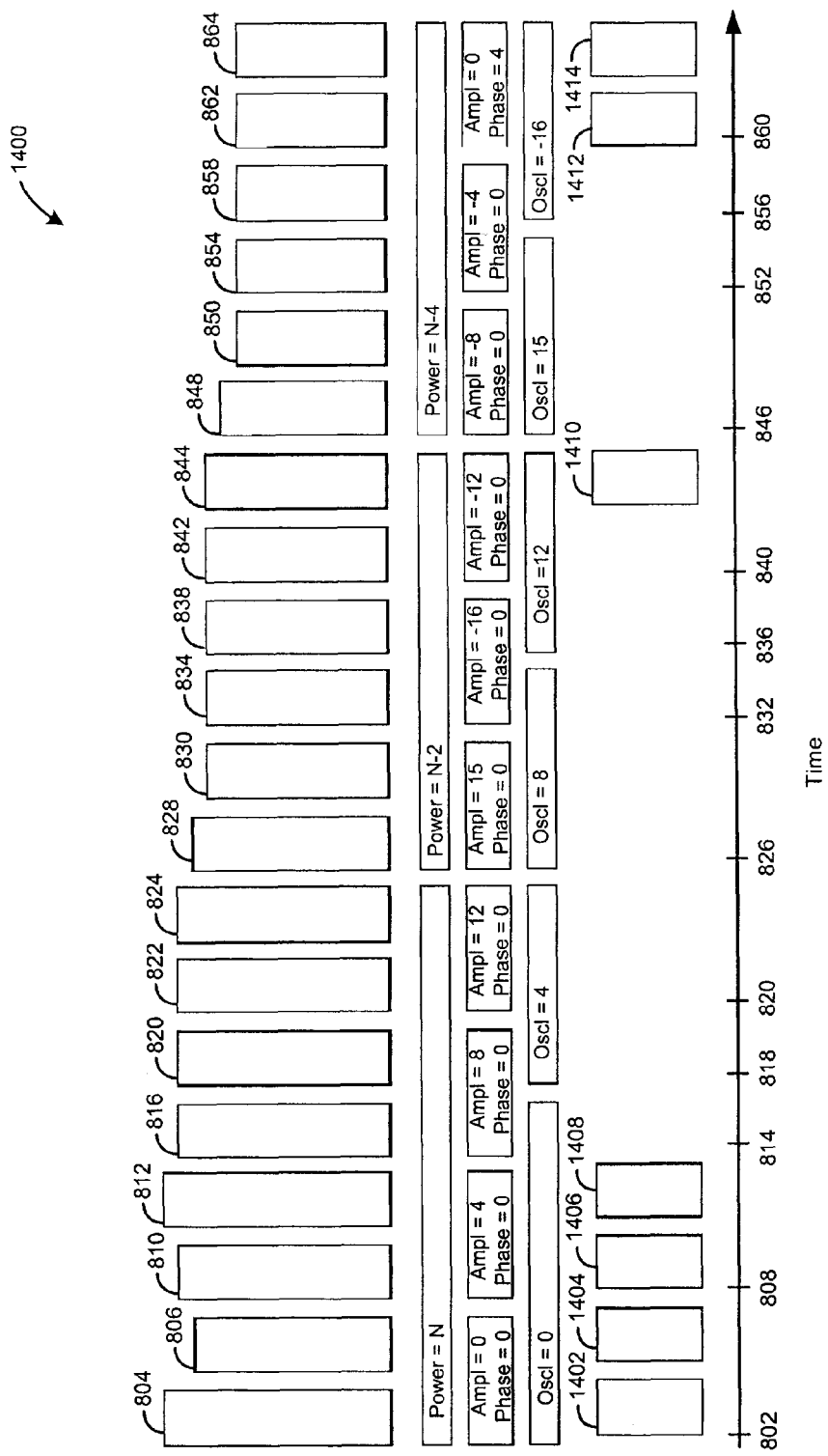
FIG. 14 is another exemplary timing diagram of the test equipment selectively capturing one or more calibration test packets transmitted from the wireless data communication system.

Rather than capture a single packet that is closest to the expected values for each calibration register 702, 704, 706, 708, 710, 712, the test equipment 160 can alternatively capture one or more packets closest to the expected values and interpolate the desired result. Referring to FIG. 14, an exemplary timing diagram of the test equipment 160 selectively capturing one or more packets closest to the expected values for each register 702, 704, 706, 708, 710, 712 based on the predetermined test flow 701, 1208 is generally identified at 1400. In this example, the DUT 100 transmits one or more test packets based on the predetermined test flow 701, 1208 to calibrate the wireless transceiver 130.

The test equipment 160 selectively captures test packets based on the predetermined test flow 701, 1208 and expected values for each of the calibration registers 702, 704, 706, 708, 710, 712. In this example, the amplitude register 708 has an expected value of 3, therefore the test equipment 160 captures packets 804, 806, 810, 812 during time intervals 1402, 1404, 1406, 1408, respectively, which are the packets closest to the expected amplitude value of 3. The test equipment 160 can interpolate packets 804, 806, 810, 812 to determine the desired calibration value for the amplitude register 708. If, for example, the oscillator register 704 has an expected value of −12, the test equipment 160 can capture packet 844 during time interval 1410 since packet 844 is the closest to the expected oscillator calibration value. Similarly, if, for example, the phase register 706 has an expected value of 1, the test equipment 160 can capture packets 862 and 864 during time intervals 1412 and 1414, which can be combined with packets 804 and 806 that were previously captured during time intervals 1042 and 1404, since the expected value (e.g., 1) is between packets 862, 864 (e.g., 4) and packets 804, 806 (e.g., 0).

Figure 15:
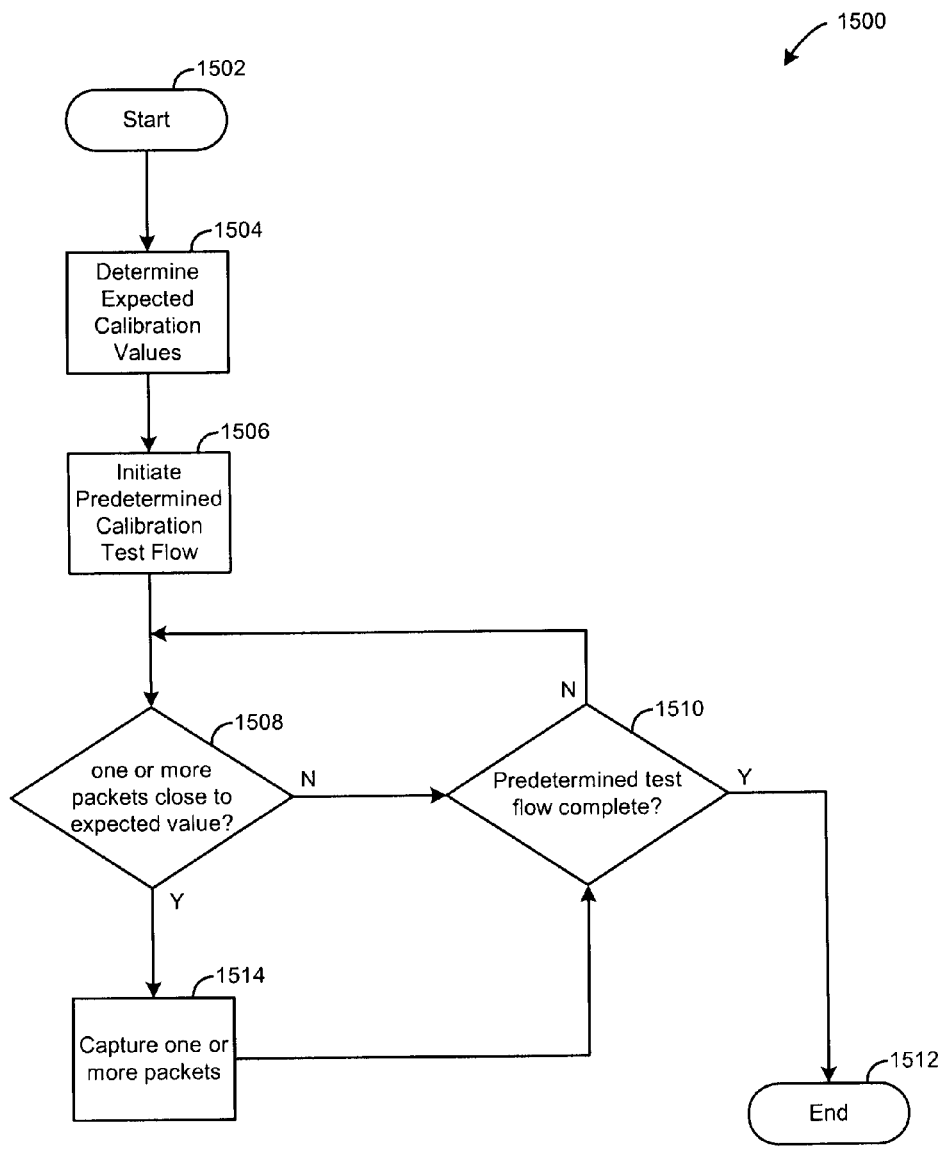
FIG. 15 is a flowchart depicting exemplary steps that can be taken by the test equipment to selectively capture one or more calibration test packets transmitted from the wireless data communication system.

Referring now to FIG. 15, exemplary steps that can be taken by the test equipment 160 to selectively capture one or more test packets based on the predetermined test flow 701, 1208 and the expected calibration values for each calibration register 702, 704, 706, 708, 710, 712 are generally identified at 1500. The process starts in step 1502. In step 1504, the test equipment 160 determines expected calibration values for each of the calibration registers 702, 704, 706, 708, 710, 712. As previously noted, the expected values can be based on previous test results. In step 1506, the test equipment 160 initiates the predetermined calibration test flow.

In step 1508, the test equipment 160 determines whether one or more test packets (transmitted from the DUT 100) are close to any of the expected calibration value for the calibration registers 702, 704, 706, 708, 710, 712. If none of the test packets are close to any of the expected calibration values for the calibration registers 702, 704, 706, 708, 710, 712, the test equipment 160 determines whether the predetermined calibration test flow is complete in step 1510. If the predetermined calibration test flow is not complete, the process returns to step 1508. However, if the predetermined calibration test flow is complete, the process ends in step 1512.

If the test equipment 160, determines that one or more of the test packets are close to at least one of the expected values of the calibration registers 702, 704, 706, 708, 710, 712, the test equipment 160 captures the one or more test packets in step 1514. Once the one or more packets have been captured, the process returns to step 1510.

Although not depicted, skilled artisans will appreciate that the aforementioned steps can be performed prior to performing the predetermined test flow in order to create a predetermined test capture flow that can used by the test equipment 160 to capture the one or more test packets.

Figure 16:
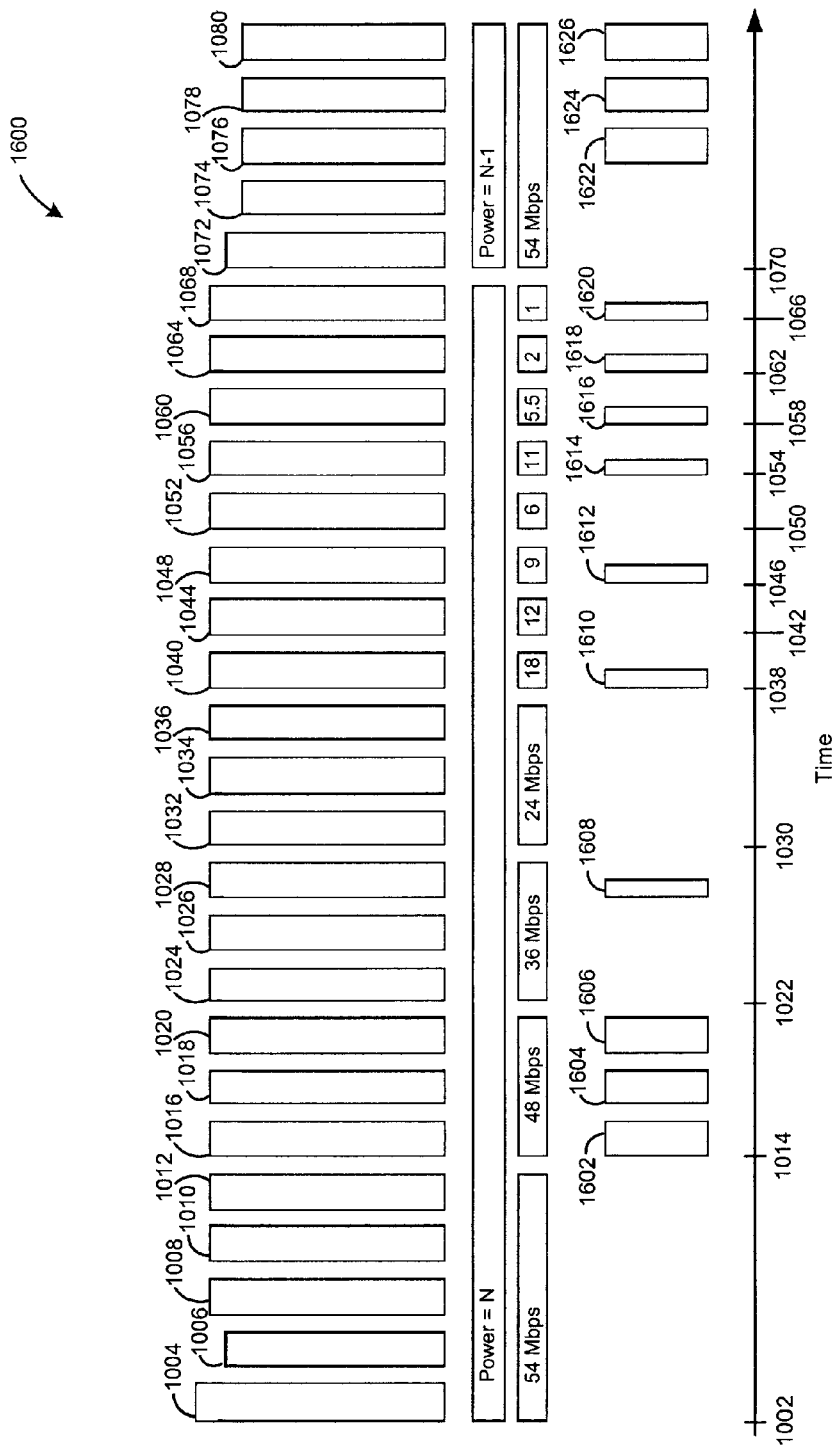
FIG. 16 is an exemplary timing diagram of the test equipment selectively capturing one or more verification test packets transmitted from the wireless data communication system.

Referring now to FIG. 16, an exemplary timing diagram of the test equipment 160 selectively capturing one or more packets based on the predetermined test flow 701, 1208 is generally identified at 1600. In this example, the DUT 100 transmits one or more test packets based on the predetermined test flow 701, 1208 to verify operation the wireless transceiver 130. The test equipment 160 selectively captures the one or more test packets based on the predetermined test flow 701, 1208 and predetermined values of interest. The predetermined values of interest can be determined by the user (not shown) prior to initiating the predetermined verification test flow. For example, if EVM and/or spectral mask of the wireless transceiver 130 is to be verified, the predetermined values can be based on a transmit power, a data rate, and/or a modulation type of each test packet. If, for example, the transmit power N is used to transmit packets at 48 Mbps, the test equipment 160 can capture packets 1016, 1018, 1020 during time intervals 1602, 1604, 1606, respectively, since the packets are transmitted at power N at a data rate of 48 Mbps. These packets can be used by the analysis module 1210 to analyze EVM and other parameters that can be extracted from the EVM analysis.

Additional measurements can be captured to verify the spectral mask of the wireless transceiver 130. For example, the test equipment 160 can selectively capture one or more test packets (or a portion thereof) for each modulation type and transmit power. Therefore, the test equipment 160 can capture a portion of packet 1028 during time interval 1608, which corresponds to transmit power N and modulation type 16-QAM. The test equipment 160 can subsequently capture a portion of packet 1040 during time interval 1610, which corresponds to transmit power N and modulation type QPSK. The test equipment 160 can subsequently capture a portion of packet 1048 during time interval 1612, which corresponds to transmit power N and modulation type BPSK. In addition, the test equipment 160 can capture packets 1056, 1060, 1064, 1068 during time intervals 1614, 1616, 1618, 1620, respectively, for each DSSS modulation type at transmit power N.

In addition, if for example, the transmit power N−1 is used to transmit packets at 54 Mbps, the test equipment 160 can capture packets 1076, 1078, 1080 during time intervals 1622, 1624, 1626, respectively, since the packets are transmitted at power N−1 at a data rate of 54 Mbps. These packets can also be used by the analysis module 1210 to analyze EVM and other known parameters that can be extracted from the EVM analysis.

Figure 17:
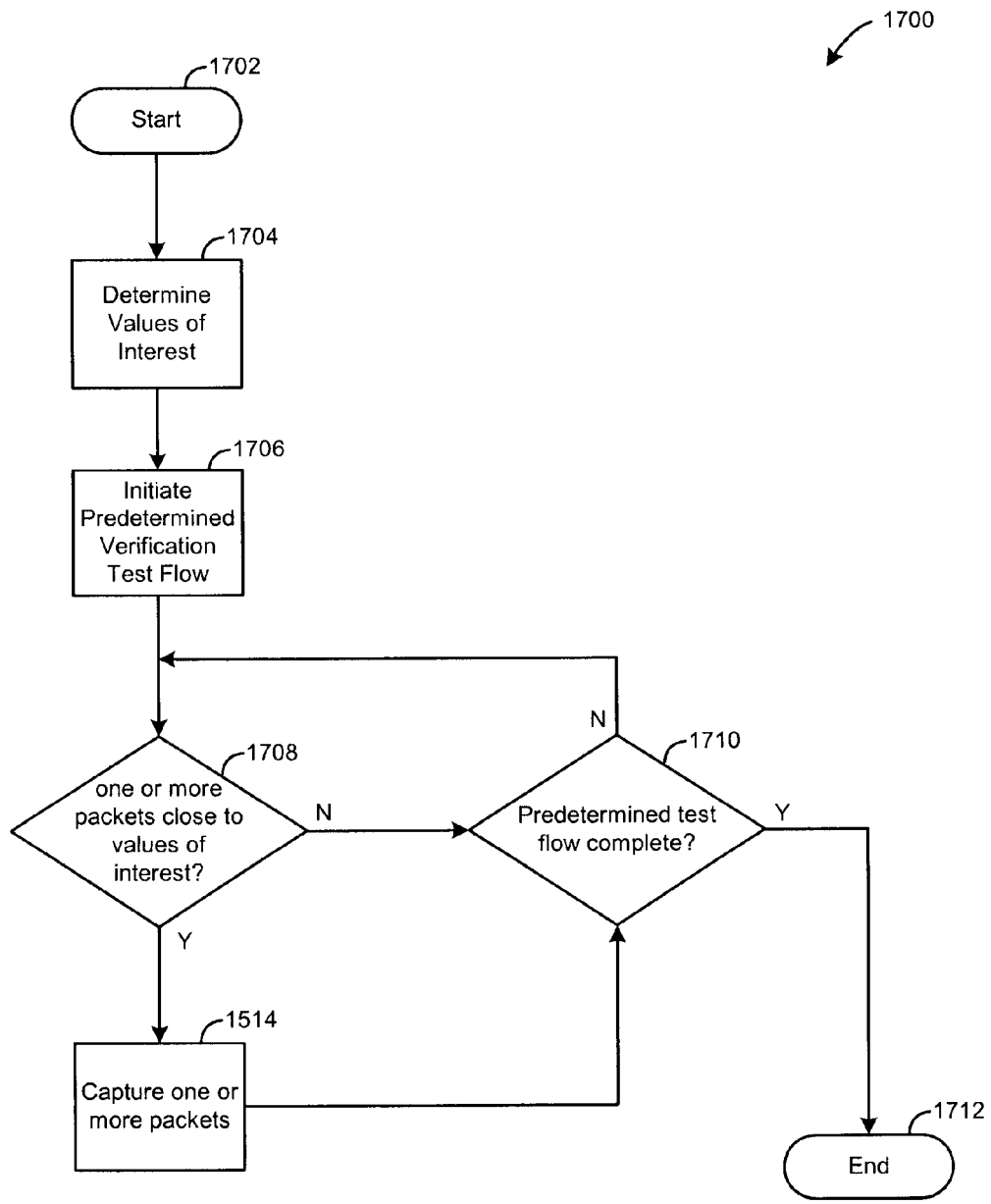
FIG. 17 is a flowchart depicting exemplary steps that can be taken by the test equipment to selectively capture one or more verification test packets transmitted from the wireless data communication system.

Referring now to FIG. 17, exemplary steps that can be taken by the test equipment 160 to selectively capture one or more test packets based on the predetermined test flow 701, 1208 and the predetermined values of interest are generally identified at 1700. The process starts in step 1702. In step 1704, the values of interest are determined, for example, by the user (not shown). In step 1706, the test equipment 160 initiates the predetermined verification test flow. In step 1708, the test equipment 160 determines whether one or more test packets (transmitted from the DUT 100) correspond to the predetermined values of interest. If none of the test packets correspond to the predetermined values of interest, the test equipment 160 determines whether the predetermined test flow 701, 1208 is complete in step 1710. If the predetermined calibration test flow 701, 1208 is not complete, the process returns to step 1708. However, if the predetermined calibration test flow is complete, the process ends in step 1712.

If the test equipment 160, determines that one or more of the test packets correspond to the predetermined values of interest, the test equipment 160 captures the one or more test packets in step 1614. Once the one or more packets have been captured, the process returns to step 1710.

As noted above, among other advantages, by pre-programming a wireless transceiver with a predetermined test flow, minimal, if any, communication between the wireless transceiver and host processor is needed during testing. Furthermore, by providing test equipment with the predetermined test flow, the test equipment can selectively capture test packets based on the predetermined test flow in order to increase testing efficiencies. Other advantages will be recognized by those of ordinary skill in the art.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus for testing circuitry of a wireless communication device, comprising:
   a receiver that is operative to receive at least one test packet transmitted from said wireless communication device;
   a capture module that is operative to capture, for later analysis, a respective single portion only of each one of said at least one test packet;
   a control module that is operative to selectively control said capture module to capture at least said portion based on a predetermined test flow; and
   a device under test (DUI) that includes
      a transmitter that is operative to transmit said at least one test packet, and
      a second control module that is operative to periodically adjust a transmission characteristic of said transmitter from a first transmission characteristic to a second transmission characteristic based on said predetermined test flow and to control said transmitter to transmit said at least one test packet based on said predetermined test flow.

2. The apparatus of claim 1 wherein said at least one test packet is transmitted by said wireless communication device according to said predetermined test flow.

3. The apparatus of claim 1 wherein said control module selectively controls said capture module to capture at least said portion based on an expected calibration value associated with said at least one test packet.

4. The apparatus of claim 3 wherein said control module controls said capture module to capture at least said portion when said wireless communication device transmits said at least one test packet based on a calibration value that is substantially equal to said expected calibration value.

5. The apparatus of claim 3 wherein said expected calibration value is based on a plurality of values including at least one of a transmit power calibration value, an oscillator calibration value, a phase calibration value, an amplitude calibration value, an in-phase DC offset calibration value, and a quadrature DC offset calibration value.

6. The apparatus of claim 1 wherein said control module selectively controls said capture module to capture at least said portion based on a predetermined value of interest.

7. The apparatus of claim 6 wherein said control module controls said capture module to capture at least said portion when said wireless communication device transmits said at least one test packet based on a transmission value that corresponds with said predetermined value of interest.

8. The apparatus of claim 1 wherein said predetermined value of interest is based on at least one of a transmit power value, a data rate value, and a modulation type value.

9. The apparatus of claim 1 wherein said DUT further comprises a calibration register that is operative to store a calibration value, wherein said transmission characteristic is based on said calibration value.

10. The apparatus of claim 9 wherein said calibration value is based on a plurality of values including at least one of a transmit power calibration value, an oscillator calibration value, a phase calibration value, an amplitude calibration value, an in-phase DC offset calibration value, and a quadrature DC offset calibration value.

11. The apparatus of claim 9 wherein said transmission characteristic is based on a transmission data rate.

12. The apparatus of claim 11 wherein said first and second transmission characteristics are based on at least one of a transmit power, a data rate, and a modulation type.

13. A wireless communication system in a test environment comprising:
a wireless communication device, comprising:
a transmitter that is operative to transmit at least one test packet; and
a first control module that is operative to periodically adjust a transmission characteristic of said transmitter from a first transmission characteristic to a second transmission characteristic based on a predetermined test flow and to control said transmitter to transmit said at least one test packet based on said predetermined test flow; and
further comprising:
a receiver that is operative to receive said at least one test packet;
a capture module that is operative to capture at least a portion of said at least one test packet; and
a second control module that is operative to selectively control said capture module to capture at least said portion based on said predetermined test flow.

14. The wireless communication system of claim 13, wherein the wireless communication device further comprises a calibration register that is operative to store a calibration value, wherein said transmission characteristic is based on said calibration value.

15. The wireless communication system of claim 14 wherein said calibration value is based on a plurality of values including at least one of a transmit power calibration value, an oscillator calibration value, a phase calibration value, an amplitude calibration value, an in-phase DC offset calibration value, and a quadrature DC offset calibration value.

16. The wireless communication system of claim 13 wherein said transmission characteristic is based on a transmission data rate.

17. The wireless communication system of claim 16 wherein said first and second transmission characteristics are based on at least one of a transmit power, a data rate, and a modulation type.

18. The system of claim 13 wherein said second control module selectively controls said capture module to capture at least said portion based on an expected calibration value associated with said at least one test packet.

19. The system of claim 18 wherein said second control module controls said capture module to capture at least said portion when said wireless communication device transmits said at least one test packet based on a calibration value that is substantially equal to said expected calibration value.

20. The system of claim 18 wherein said expected calibration value is based on a plurality of values including at least one of a transmit power calibration value, an oscillator calibration value, a phase calibration value, an amplitude calibration value, an in-phase DC offset calibration value, and a quadrature DC offset calibration value.

21. The system of claim 13 wherein said second control module selectively controls said capture module to capture at least said portion based on a predetermined value of interest.

22. The system of claim 21 wherein said second control module controls said capture module to capture at least said portion when said wireless communication device transmits said at least one test packet based on a transmission value that corresponds with said predetermined value of interest.

23. The system of claim 13 wherein said predetermined value of interest is based on at least one of a transmit power value, a data rate value, and a modulation type value.

24. A method of testing circuitry of a wireless communication device, comprising:
receiving at least one test packet from said wireless communication device;
selectively capturing, for later analysis, a respective single portion only of each one of said at least one test packet based on a predetermined test flow;
transmitting said at least one test packet; and
periodically adjusting a transmission characteristic of said transmitter from a first transmission characteristic to a second transmission characteristic based on said predetermined test flow and to control said transmitting of said at least one test packet based on said predetermined test flow.

25. The method of claim 24 wherein said at least one test packet is transmitted by said wireless communication device based on said predetermined test flow.

26. The method of claim 24 further comprising selectively capturing at least said portion based on an expected calibration value associated with said at least one test packet.

27. The method of claim 26 further comprising capturing at least said portion when said wireless communication device transmits said at least one test packet based on a calibration value that is substantially equal to said expected calibration value.

28. The method of claim 26 wherein said expected calibration value is based on a plurality of values including at least one of a transmit power calibration value, an oscillator calibration value, a phase calibration value, an amplitude calibration value, an in-phase DC offset calibration value, and a quadrature DC offset calibration value.

29. The method of claim 24 further comprising selectively capturing at least said portion based on a predetermined value of interest.

30. The method of claim 29 further comprising capturing at least said portion when said wireless communication device transmits said at least one test packet based on a transmission value that corresponds with said predetermined value of interest.

31. The method of claim 24 wherein said predetermined value of interest is based on at least one of a transmit power value, a data rate value, and a modulation type value.

32. The method of claim 24 further comprising storing a calibration value, wherein said transmission characteristic is based on said calibration value.

33. The method of claim 32 wherein said calibration value is based on a plurality of values including at least one of a transmit power calibration value, an oscillator calibration value, a phase calibration value, an amplitude calibration value, an in-phase DC offset calibration value, and a quadrature DC offset calibration value.

34. The method of claim 32 wherein said transmission characteristic is based on a transmission data rate.

35. The method of claim 34 wherein said first and second transmission characteristics are based on at least one of a transmit power, a data rate, and a modulation type.

\* \* \* \* \*